(12) United States Patent
Kim et al.

(10) Patent No.: US 11,665,439 B2
(45) Date of Patent: May 30, 2023

(54) IMAGE SENSOR, A MOBILE DEVICE INCLUDING THE SAME AND A METHOD OF CONTROLLING SENSING SENSITIVITY OF AN IMAGE SENSOR

(71) Applicant: SAMSUNG ELECTRONICS CO., LTD., Suwon-si (KR)

(72) Inventors: Mooyoung Kim, Suwon-si (KR); Kyoungmin Koh, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 17/143,466

(22) Filed: Jan. 7, 2021

(65) Prior Publication Data
US 2021/0377496 A1  Dec. 2, 2021

(30) Foreign Application Priority Data

Jun. 1, 2020 (KR) .................. 10-2020-0065833

(51) Int. Cl.
*H04N 9/04* (2006.01)
*H04N 5/369* (2011.01)
*H04N 5/341* (2011.01)

(52) U.S. Cl.
CPC .......... *H04N 9/0451* (2018.08); *H04N 5/341* (2013.01); *H04N 5/3696* (2013.01)

(58) Field of Classification Search
CPC .... H04N 9/0451; H04N 5/341; H04N 5/3696; H04N 5/347; H04N 5/37457; H04N 9/04557
See application file for complete search history.

(56) References Cited

U.S. PATENT DOCUMENTS

| | | | |
|---|---|---|---|
| 4,281,339 A * | 7/1981 | Morishita | ......... H01L 27/14621 348/282 |
| 7,916,362 B2 | 3/2011 | Kijima et al. | |
| 8,139,130 B2 | 3/2012 | Compton et al. | |
| 8,306,362 B2 | 11/2012 | Compton | |
| 8,854,515 B2 | 10/2014 | Lin et al. | |
| 9,319,611 B2 | 4/2016 | Fan | |
| 9,780,130 B2 | 10/2017 | Suh et al. | |
| 10,304,879 B2 | 5/2019 | Mabuchi | |
| 2006/0238123 A1* | 10/2006 | Kang | ....................... H01J 11/36 313/582 |
| 2009/0066782 A1* | 3/2009 | Choi | ..................... H04N 3/155 348/E5.022 |
| 2014/0118572 A1 | 5/2014 | Kuang et al. | |
| 2017/0125490 A1* | 5/2017 | Li | ........................... H01L 51/52 |

* cited by examiner

*Primary Examiner* — Antoinette T Spinks
(74) *Attorney, Agent, or Firm* — F. Chau & Associates, LLC

(57) ABSTRACT

An image sensor including: a pixel array disposed under a display panel, the pixel array including a plurality of pixels configured to perform a sensing operation by collecting a photo-charge generated by a light that penetrates the display panel; a row driver configured to drive the plurality of pixels row by row; and a controller configured to control the pixel array and the row driver such that a sensing sensitivity of blue pixels among the plurality of pixels is higher than a sensing sensitivity of red pixels and a sensing sensitivity of green pixels among the plurality of pixels.

9 Claims, 32 Drawing Sheets

IMAGE SENSOR, A MOBILE DEVICE INCLUDING THE SAME AND A METHOD OF CONTROLLING SENSING SENSITIVITY OF AN IMAGE SENSOR

CROSS-REFERENCE TO RELATED APPLICATION

This U.S. non-provisional patent application claims priority under 35 U.S.C. § 119 to Korean Patent Application No. 10-2020-0065833, filed on Jun. 1, 2020, in the Korean Intellectual Property Office (KIPO), the disclosure of which is incorporated by reference herein in its entirety.

1. TECHNICAL FIELD

Exemplary embodiments of the inventive concept relate to semiconductor integrated circuits, and more particularly to an image sensor, a mobile device including the image sensor and a method of controlling sensing sensitivity of an image sensor.

2. DISCUSSION OF THE RELATED ART

A digital camera module is integrated in various host devices such as a mobile phone, a personal portable device, a computing device, etc. For example, most smartphones have a built-in digital camera. As demand for devices with the integrated digital camera module increases, a high-performance digital camera with a small occupation area that may be easily integrated in a host device may be beneficial. In an example configuration, a camera module may be disposed under a display panel to provide a wide display screen. In this case, however, light has to pass through the display panel to be incident on an image sensor in the camera module. As a consequence, the intensity of the light incident on the image sensor may be decreased, and thus, performance of the image sensor may be degraded.

SUMMARY

According to an exemplary embodiment of the inventive concept, there is provided an image sensor including: a pixel array disposed under a display panel, the pixel array including a plurality of pixels configured to perform a sensing operation by collecting a photo-charge generated by a light that penetrates the display panel; a row driver configured to drive the plurality of pixels row by row; and a controller configured to control the pixel array and the row driver such that a sensing sensitivity of blue pixels among the plurality of pixels is higher than a sensing sensitivity of red pixels and a sensing sensitivity of green pixels among the plurality of pixels.

According to an exemplary embodiment of the inventive concept, there is provided a mobile device including: a housing case having an upper surface, the upper surface having an opening; a display panel disposed in the opening of the housing case; and an image sensor disposed below the display panel, the image sensor including: a pixel array disposed under the display panel, the pixel array including a plurality of pixels configured to perform a sensing operation by collecting a photo-charge generated by a light that penetrates the display panel; a row driver configured to drive the plurality of pixels row by row; and a controller configured to control the pixel array and the row driver such that a sensing sensitivity of blue pixels among the plurality of pixels is higher than a sensing sensitivity of red pixels and a sensing sensitivity of green pixels among the plurality of pixels.

According to an exemplary embodiment of the inventive concept, there is provided a method of controlling sensing sensitivity of an image sensor, the method including: determining target color pixels among a plurality of pixels included in a pixel array, the target color pixels corresponding to a wavelength having a lowest transmission ratio through the display panel among the plurality of pixels of different colors; and increasing a sensing sensitivity of the target color pixels to be higher than sensing sensitivities of other color pixels.

According to an exemplary embodiment of the inventive concept, there is provided an image sensor including: a pixel array overlapped by a display panel, the pixel array including a plurality of pixels, wherein each pixel is configured to perform a sensing operation by collecting a photo-charge generated by light passing through the display panel; a row driver configured to drive the plurality of pixels; and a controller configured to control the pixel array and the row driver such that a sensing sensitivity of first pixels among the plurality of pixels is greater than a sensing sensitivity of second pixels and a sensing sensitivity of third pixels among the plurality of pixels.

DETAILED DESCRIPTION OF THE EMBODIMENTS

Figure 1:
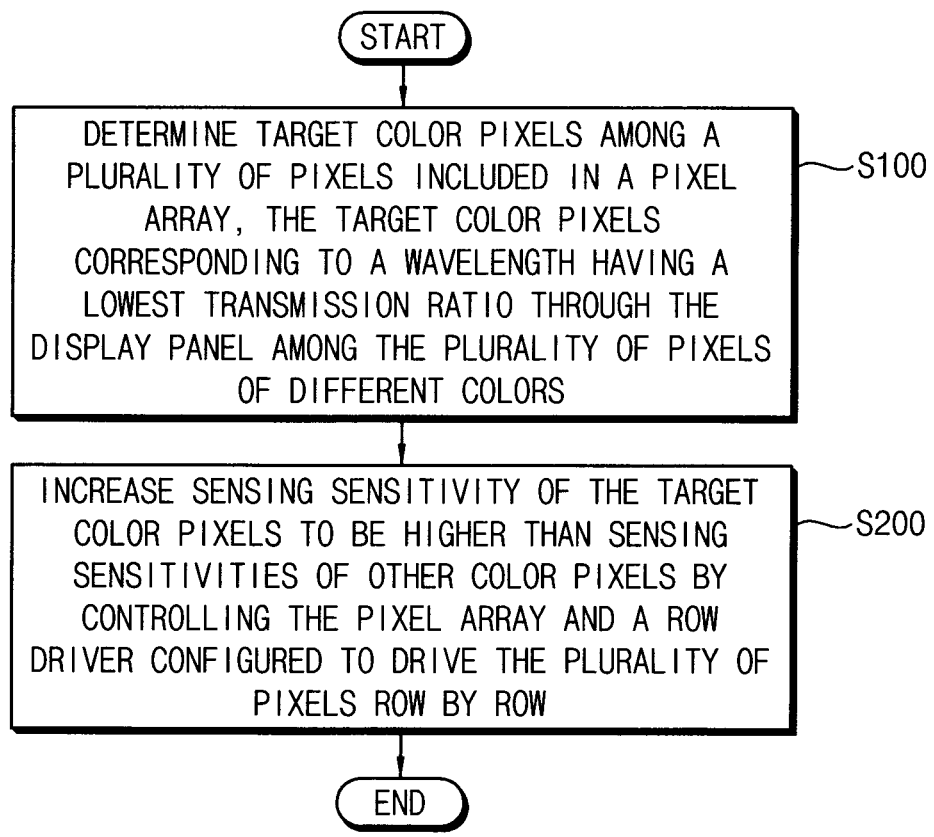
FIG. 1 is a flow chart illustrating a method of controlling sensing sensitivity of an image sensor according to exemplary embodiments of the inventive concept.

Various exemplary embodiments of the inventive concept will be described more fully hereinafter with reference to the accompanying drawings. In the drawings, like numerals may refer to like elements. Thus, repeated descriptions may be omitted.

FIG. 1 is a flow chart illustrating a method of controlling sensing sensitivity of an image sensor according to exemplary embodiments of the inventive concept.

Referring to FIG. 1, target color pixels may be determined among a plurality of pixels included in a pixel array such that the target color pixels correspond to a wavelength having a lowest transmission ratio through the display panel among the plurality of pixels of different colors (S100).

Sensing sensitivity of the target color pixels may be increased to be higher than sensing sensitivities of other color pixels by controlling the pixel array and a row driver configured to drive the plurality of pixels row by row (S200).

In an exemplary embodiment of the inventive concept, as will be described with reference to FIGS. 2 through 5, the target color pixels may be blue color pixels and the other color pixels may be red pixels and green pixels.

In an exemplary embodiment of the inventive concept, to increase the sensing sensitivity of the target color pixels, a sensing operation of the other color pixels may be performed such that a photo-charge collected by each of the other color pixels is sensed independently, and the sensing of the target color pixels may be performed such that photo-charges collected by two or more target color pixels are summed and measured.

In an exemplary embodiment of the inventive concept, to increase the sensing sensitivity of the target color pixels, the pixel array may be configured such that a number of the target pixels corresponding to a first color may be greater than a number of the other color pixels corresponding to a second color different from the first color.

In an exemplary embodiment of the inventive concept, to increase the sensing sensitivity of the target color pixels, a sensing operation of the other color pixels may be performed such that a photo-charge collected by each of the other color pixels is sensed independently, and the sensing of the target color pixels may be performed two or more times whenever the sensing operation of the other color pixels is performed once.

As such, image quality and performance of the image sensor may be enhanced by efficiently increasing the sensing sensitivity of the target color pixels corresponding to the wavelength having the lowest transmission ratio.

Hereinafter, increase of sensing sensitivity will be described with respect to a light that penetrates a display panel referring to non-limiting exemplary embodiments of the inventive concept.

Figure 2:
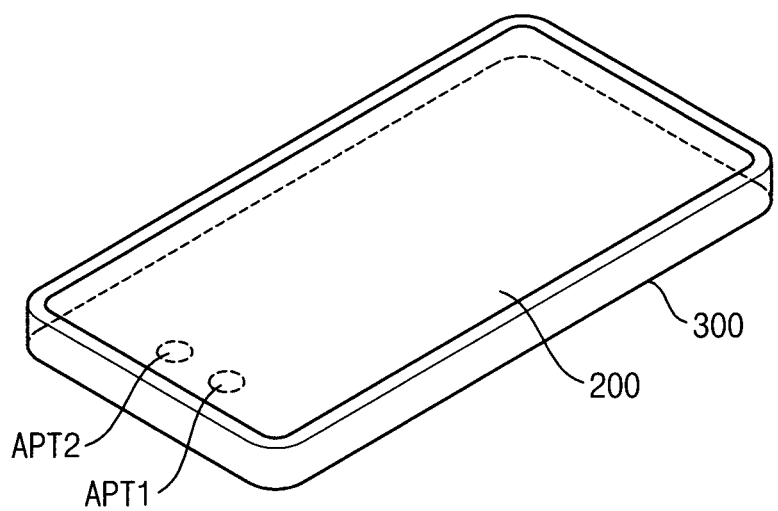
FIG. 2 is a diagram illustrating a perspective view of a mobile device including an image sensor according to exemplary embodiments of the inventive concept.
Figure 3:
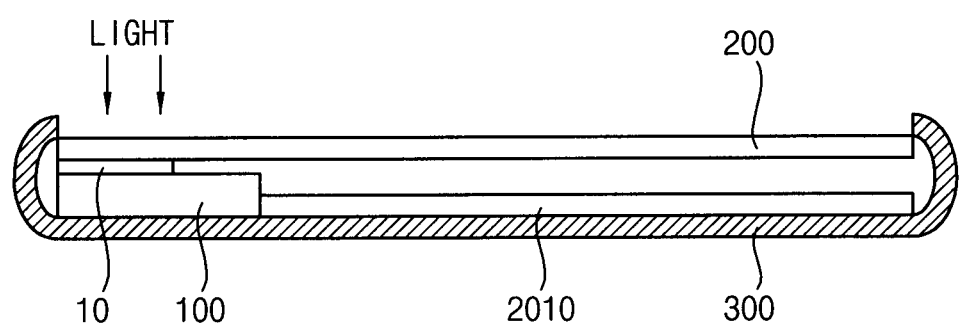
FIG. 3 is a diagram illustrating a vertical structure of the mobile device of FIG. 2.

FIG. 2 is a diagram illustrating a perspective view of a mobile device including an image sensor according to exemplary embodiments of the inventive concept, and FIG. 3 is a diagram illustrating a vertical structure of the mobile device of FIG. 2.

Referring to FIGS. 2 and 3, a mobile device 2000 such as, for example, a smartphone, may include an image sensor 100, a display panel 200, a housing case 300, a light blocking layer 10 and a main board 2010.

The housing case 300 may have an upper surface defining an opening, and the display panel 200 may be disposed in the opening defined by the upper surface of the housing case 300. The light blocking layer 10 may be disposed between the image sensor 100 and the display panel 200. A plurality of apertures APT1 and APT2 may be formed in the light blocking layer 10 to pass light that has penetrated the display panel 200.

Figure 4:
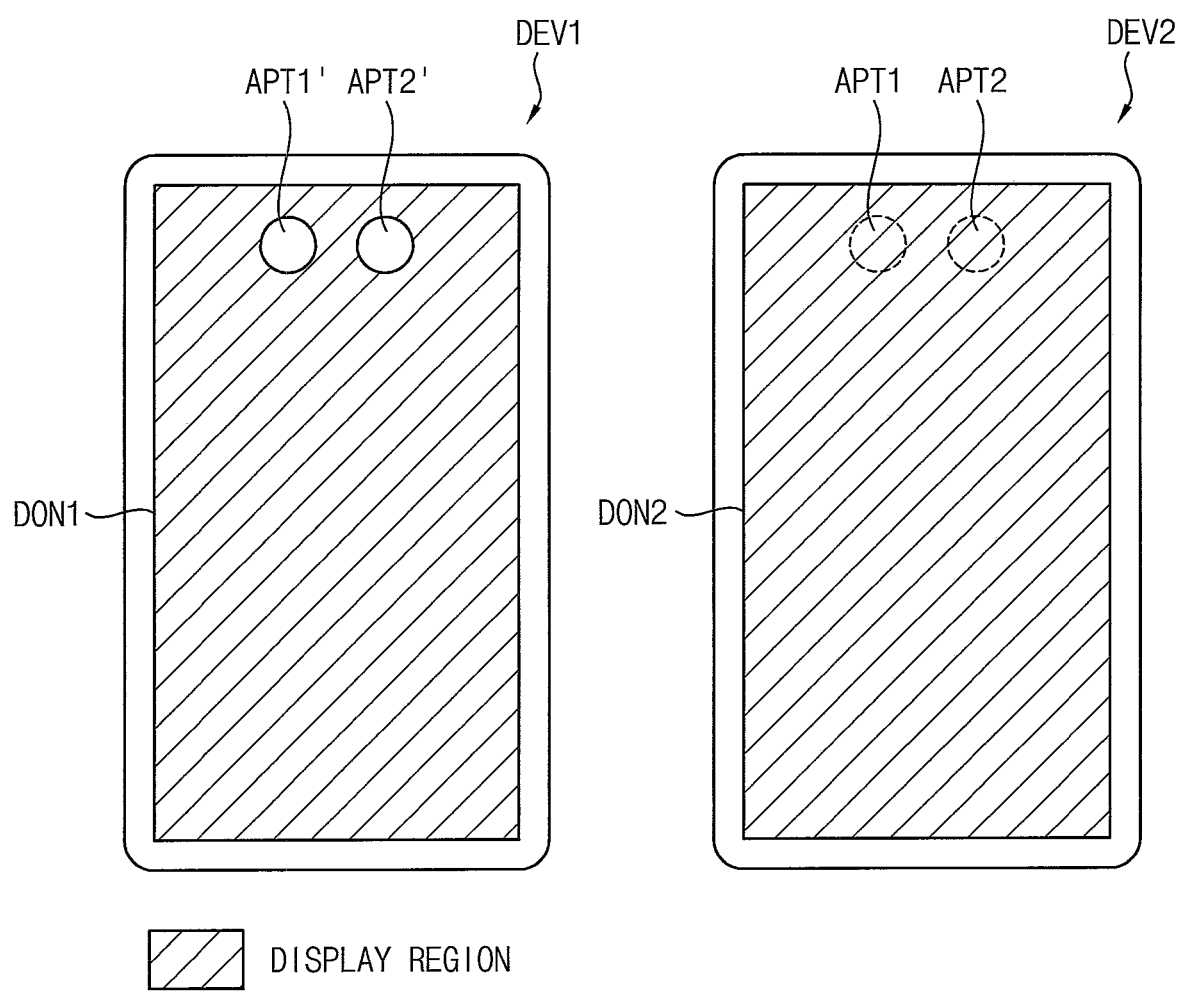
FIG. 4 is a diagram for describing a display function of a mobile device according to exemplary embodiments of the inventive concept.

FIG. 4 is a diagram for describing a display function of a mobile device according to exemplary embodiments of the inventive concept.

FIG. 4 illustrates a first mobile device DEV1 and a second mobile device DEV2 having an under display camera (UDC) structure such that a camera is disposed under a display panel.

Conventional imaging devices employ a lens of a large size or multiple cameras to obtain sufficient light amounts to increase image quality in low-luminance environments. In addition, the conventional imaging devices include an aperture in the display panel to compensate for an interference pattern due to a lattice structure of the display panel.

A first display panel DON1 of the first mobile device DEV1 according to a conventional scheme includes apertures APT1' and APT2' to increase the amount of the vertical light provided to the camera disposed under the first display panel DON1. In this case, a portion of an image cannot be displayed on the aperture portion of the first display panel DON1 as shown in FIG. 4.

In contrast, in the case of the second mobile device DEV2, the apertures APT1 and APT2 are formed in the light blocking layer 10 between a second display panel DON2 and the image sensor 100 to pass the vertical light that has penetrated the second display panel DON2. The second display panel DON2 may not include apertures for the image sensor 100 disposed under the second display panel DON2, and thus, an entire image may be displayed on the entire region of the second display panel DON2.

Figure 5:
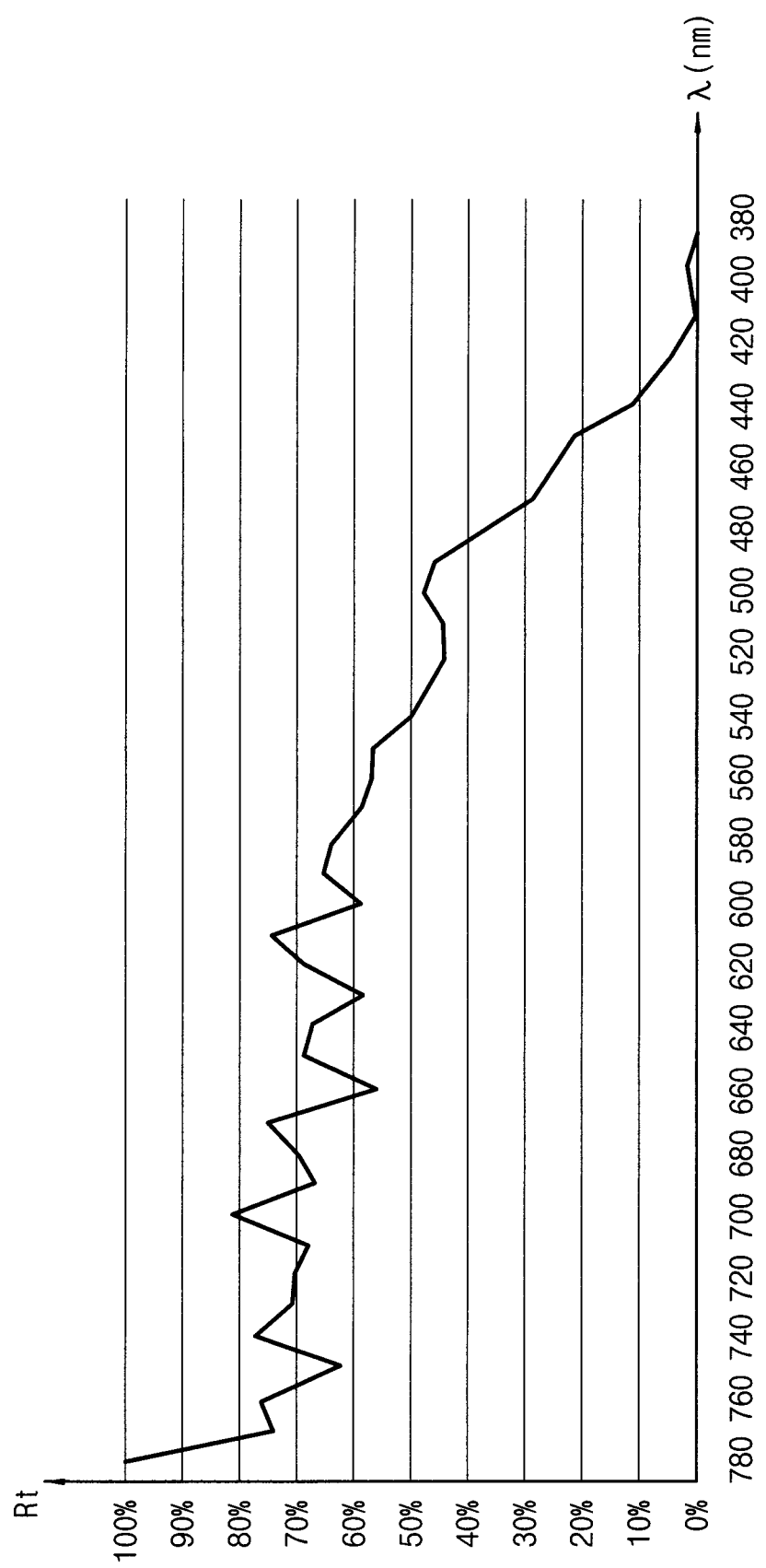
FIG. 5 is a diagram illustrating a transmission ratio of a display panel according to a wavelength of an incident light.

FIG. 5 is a diagram illustrating a transmission ratio of a display panel according to a wavelength of an incident light.

The wavelength of visible light is in a range between about 380 nm and about 800 nm. The wavelength of red light is about 723 nm through 647 nm, the wavelength of green light is about 575 nm through 492 nm, and the wavelength of blue light is about 492 nm through 455 nm.

In FIG. 5, the horizontal axis indicates a wavelength (λ) of light and the vertical axis indicates a normalized transmission ratio (Rt) of an example display panel. As illustrated in FIG. 5, the transmission ratio of the display panel decreases as the wavelength of the light decreases, and thus, quality of an image captured by the under panel camera may be degraded due to the decrease in the sensing sensitivity with respect to the blue light. Exemplary embodiments of the inventive concept implement a front camera capable of displaying an image on the entire region of the display panel without an aperture on the display panel.

Figure 6:
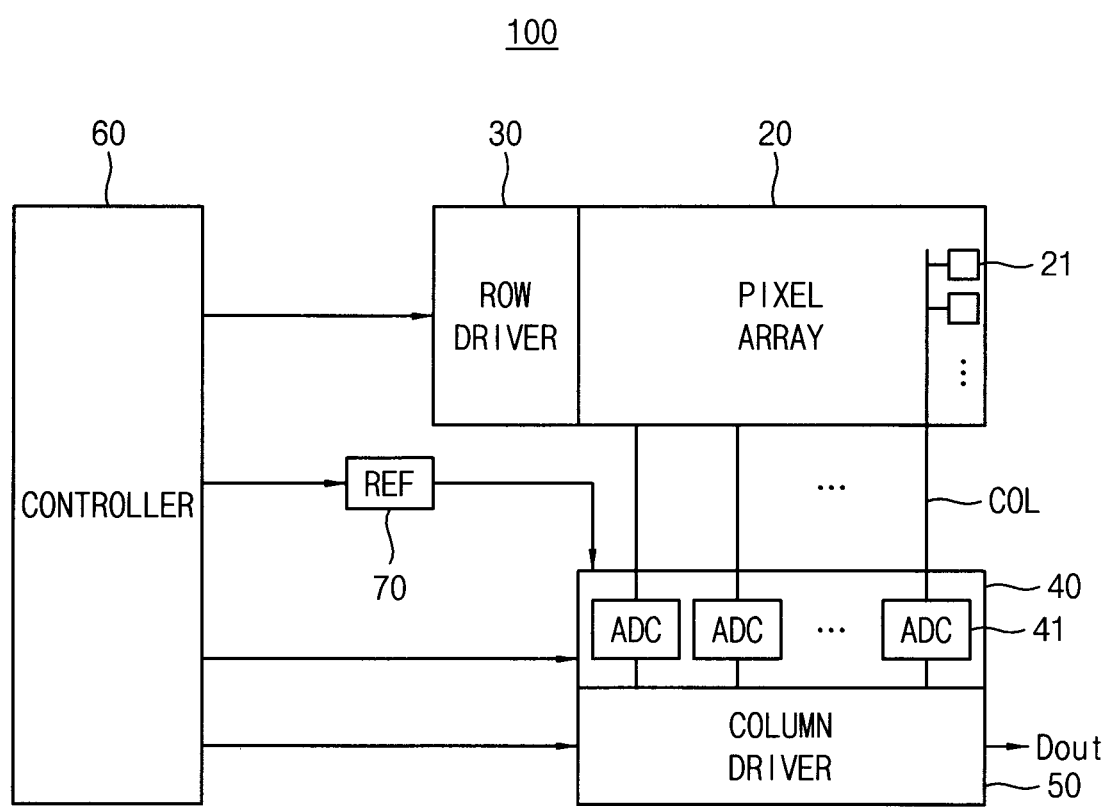
FIG. 6 is a block diagram illustrating an image sensor according to exemplary embodiments of the inventive concept.

FIG. 6 is a block diagram illustrating an image sensor according to exemplary embodiments of the inventive concept.

Referring to FIG. 6, an image sensor 100 may include a pixel array 20, a row driver 30, an analog-to-digital conversion circuit 40, a column driver 50, a controller 60, and a reference signal generator REF 70.

The pixel array 20 includes a plurality of pixels 21 coupled to column lines COL, respectively, and the plurality of pixels 21 senses incident light to generate analog signals through the column lines COL. The plurality of pixels 21 may be arranged in matrix form with a plurality of rows and a plurality of columns. The pixel array 20 may have a shared structure, as will be described below, in which a plurality of pixels are commonly connected to a floating diffusion node.

The row driver 30 may be coupled to the rows of the pixel array 20 to generate signals for driving the rows. For example, the row driver 30 may drive the pixels in the pixel array 20 row by row.

The analog-to-digital conversion circuit 40 may be coupled to the columns of the pixel array 20 to convert the analog signals from the pixel array 20 to digital signals. As illustrated in FIG. 6, the analog-to-digital conversion circuit 40 may include a plurality of analog-to-digital converters (ADC) 41 to perform analog-to-digital conversion of the analog signals output from the column lines COL in parallel or simultaneously. The analog-to-digital converters 41 may be delta-sigma analog-to-digital converters for performing delta-sigma modulation and digital filtering to convert the analog signals to digital signals.

The analog-to-digital conversion circuit 40 may include a correlated double sampling (CDS) unit. In an exemplary embodiment of the inventive concept, the CDS unit may perform an analog double sampling by extracting a valid image component based on a difference between an analog reset signal and an analog image signal. In another exemplary embodiment of the inventive concept, the CDS unit may perform a digital double sampling by converting the analog reset signal and the analog image signal to two digital signals and extracting a difference between the two digital signals as the valid image component. In still another exemplary embodiment of the inventive concept, the CDS unit may perform a dual CDS by performing both the analog double sampling and digital double sampling.

The column driver 50 may output the digital signals from the analog-to-digital conversion circuit 40 sequentially as output data Dout.

The controller 60 may control the row driver 30, the analog-to-digital conversion circuit 40, the column driver 50, and the reference signal generator 70. The controller 60 may provide control signals such as clock signals, timing control signals, etc. required for the operations of the row driver 30, the analog-to-digital conversion circuit 40, the column driver 50, and the reference signal generator 70. The controller 60 may include a control logic circuit, a phase-locked loop, a timing control circuit, a communication interface circuit, etc.

In particular, the controller 60 may control the pixel array 20 and the row driver 30 such that sensing sensitivity of blue pixels in the pixel array 20 is increased to be higher than sensing sensitivity of red pixels and sensing sensitivity of green pixels in the pixel array 20. Here, the blue pixels correspond to a wavelength having a lowest transmission ratio through the display panel among the red pixels, the green pixels and the blue pixels.

The reference signal generator 70 may generate a reference signal or a ramp signal that increases or decreases gradually and provide the ramp signal to the analog-to-digital conversion circuit 40.

Figure 7:
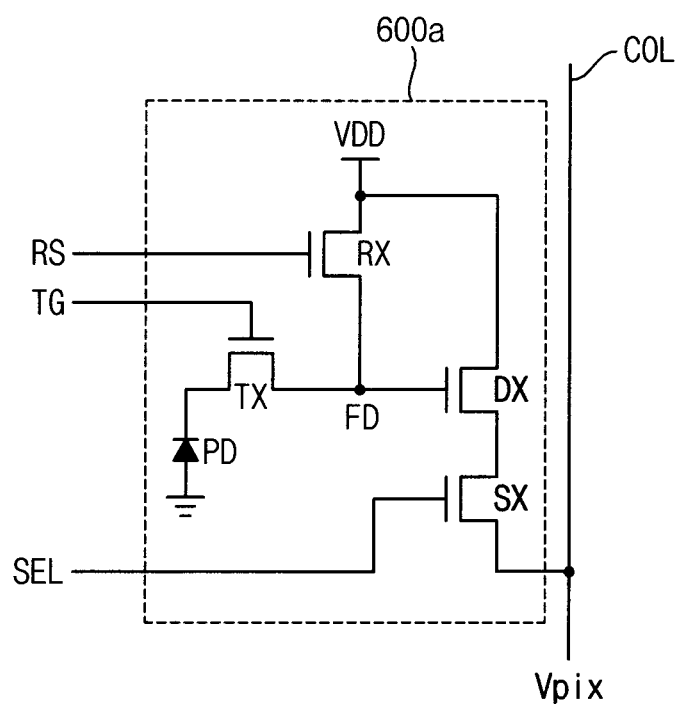
FIG. 7 is a circuit diagram illustrating a pixel including in an image sensor according to exemplary embodiments of the inventive concept.

FIG. 7 is a circuit diagram illustrating a pixel including in an image sensor according to exemplary embodiments of the inventive concept.

Referring to FIG. 7, a unit pixel 600a may include a photo-sensitive element such as a photodiode PD, and a readout circuit including a transfer transistor TX, a reset transistor RX, a drive transistor DX and/or a selection transistor SX.

For example, the photodiode PD may include an n-type region in a p-type substrate such that the n-type region and the p-type substrate form a p-n conjunction diode. The photodiode PD receives the incident light and generates a photo-charge based on the incident light. In some exemplary embodiments of the inventive concept, the unit pixel 600a may include a phototransistor, a photogate, and/or a pinned photodiode, etc. instead of, or in addition to, the photodiode PD.

The photo-charge generated in the photodiode PD may be transferred to a floating diffusion node FD through the transfer transistor TX. The transfer transistor TX may be turned on in response to a transfer control signal TG The drive transistor DX functions as a source follower amplifier that amplifies a signal corresponding to the charge on the floating diffusion node FD. The selection transistor SX may transfer the pixel signal Vpix to a column line COL in response to a selection signal SEL. The floating diffusion node FD may be reset by the reset transistor RX. For example, the reset transistor RX may discharge the floating diffusion node FD in response to a reset signal RS for correlated double sampling (CDS).

FIG. 7 illustrates the unit pixel 600a of the four-transistor configuration including the four transistors TX, RX, DX and SX. The configuration of the unit pixel may be variously changed and the pixel structure is not limited to that of FIG. 7.

Figure 8:
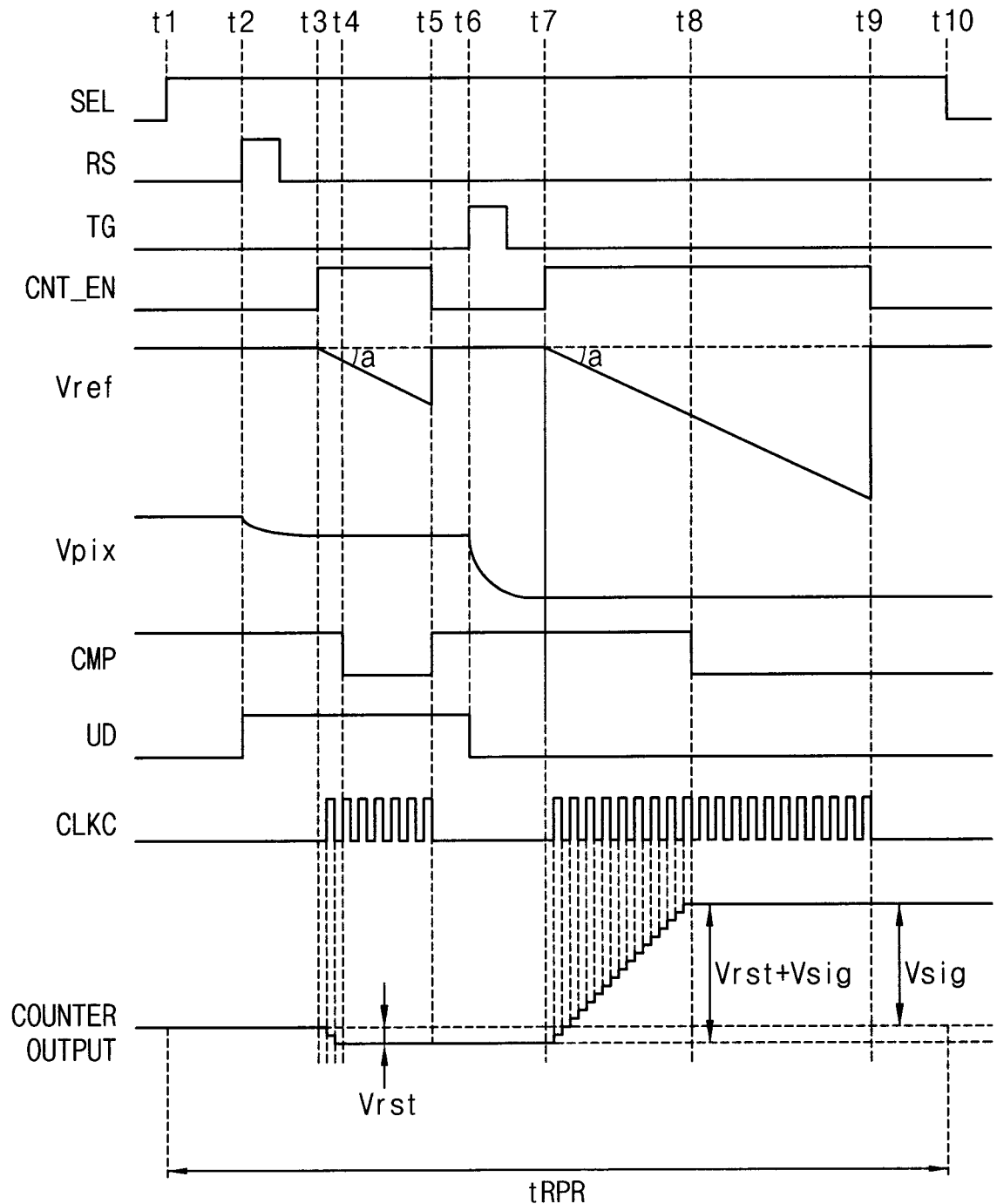
FIG. 8 is a timing diagram illustrating an operation of an image sensor according to exemplary embodiments of the inventive concept.

FIG. 8 is a timing diagram illustrating an operation of an image sensor according to exemplary embodiments of the inventive concept.

FIG. 8 illustrates a sensing period tRPR corresponding to a sensing operation of a pixel. The sensing operation may be performed simultaneously with respect to pixels corresponding to the same transfer control signal TG.

Referring to FIGS. 6, 7 and 8, at a time t1, the row driver 30 may select one of rows included in the pixel array 20 by providing an activated row selection signal SEL to the selected row of the pixel array 20.

At a time t2, the row driver 30 may provide an activated reset control signal RS to the selected row, and the controller 60 may provide an up-down control signal UD having a logic high level to a counter included in the ADC 41. From the time t2, the pixel array 20 may output a first analog signal corresponding to a reset component Vrst as the pixel voltage Vpix.

At a time t3, the controller 60 may provide a count enable signal CNT_EN having a logic high level to the reference signal generator 70, and the reference signal generator 70 may start to decrease the reference signal Vref at the constant rate, e.g., a slope of 'a'. The controller 60 may provide a count clock signal CLKC to the counter, and the counters may perform down-counting from zero in synchronization with the count clock signal CLKC.

At a time t4, a magnitude of the reference signal Vref may become smaller than a magnitude of the pixel voltage Vpix, and a comparator included in the ADC 41 may provide a comparison signal CMP having a logic low level to the counter so that the counter stops performing the down-counting. At the time t4, a counter output of the counter may be the first counting value that corresponds to the reset component Vrst. In the example of FIG. 8, the counter output of the counter at the time t4 may be −2.

At a time t5, the controller 60 may provide the count enable signal CNT_EN having a logic low level to the reference signal generator 70, and the reference signal generator 70 may stop generating the reference signal Vref.

A period from the time t3 to the time t5 corresponds to a maximum time for detecting the reset component Vrst. A length of the period from the time t3 to the time t5 may be determined as a certain number of the count clock signal CLKC according to a characteristic of the image sensor 100.

At a time t6, the row driver 30 may provide an activated transfer control signal TG (e.g., the transfer control signal TG having a logic high level) to the selected row, and the controller 60 may provide the up-down control signal UD having a logic low level to the counter. From the time t6, the pixel array 20 may output a second analog signal AS2 corresponding to a detected incident light Vrst+Vsig as the pixel voltage Vpix.

At a time t7, the controller 60 may provide the count enable signal CNT_EN having a logic high level to the reference signal generator 70, and the reference signal generator 70 may start to decrease the reference signal Vref at the same constant rate as at the time t3, e.g., a slope of 'a'. The comparator may provide the comparison signal CMP having a logic high level to the counter since the pixel voltage Vpix is smaller than the reference signal Vref. The controller 60 may provide the count clock signal CLKC to the counter, and the counter may perform an up-counting from the first counting value, which corresponds to the reset component Vrst, in synchronization with the count clock signal CLKC.

At a time t8, the magnitude of the reference signal Vref may become smaller than the magnitude of the pixel voltage Vpix, and the comparator may provide the comparison signal CMP having a logic low level to the counter so that the counter stops performing the up-counting. At the time t8, the counter output of the counter may correspond to a difference between the first analog signal representing the reset component Vrst (e.g., −2 in the example of FIG. 8) and the second analog signal representing the detected incident light Vrst+Vsig (e.g., 17 in the example of FIG. 8). The difference may be an effective intensity of incident light Vsig (e.g., 15 in the example of FIG. 8). The counter may output the effective intensity of incident light Vsig as the digital signal.

At a time t9, the controller 60 may provide the count enable signal CNT_EN having a logic low level to the reference signal generator 70, and the reference signal generator 70 may stop generating the reference voltage Vref.

A period from the time t7 to the time t9 corresponds to a maximum time for detecting the detected incident light Vrst+Vsig. A length of the period from the time t7 to the time t9 may be determined as a certain number of the count clock signal CLKC according to a characteristic of the image sensor 100.

At a time t10, the row driver 30 may provide a deactivated row selection signal SEL (e.g., the row selection signal having a low level) to the selected row of the pixel array 20, and the counter may reset the counter output to zero.

After that, the image sensor 100 may repeat above described operations on each row to generate the digital signals row by row.

The inventive concept is not limited to the example configuration and operation described with reference to FIGS. 6, 7 and 8.

Figure 9:
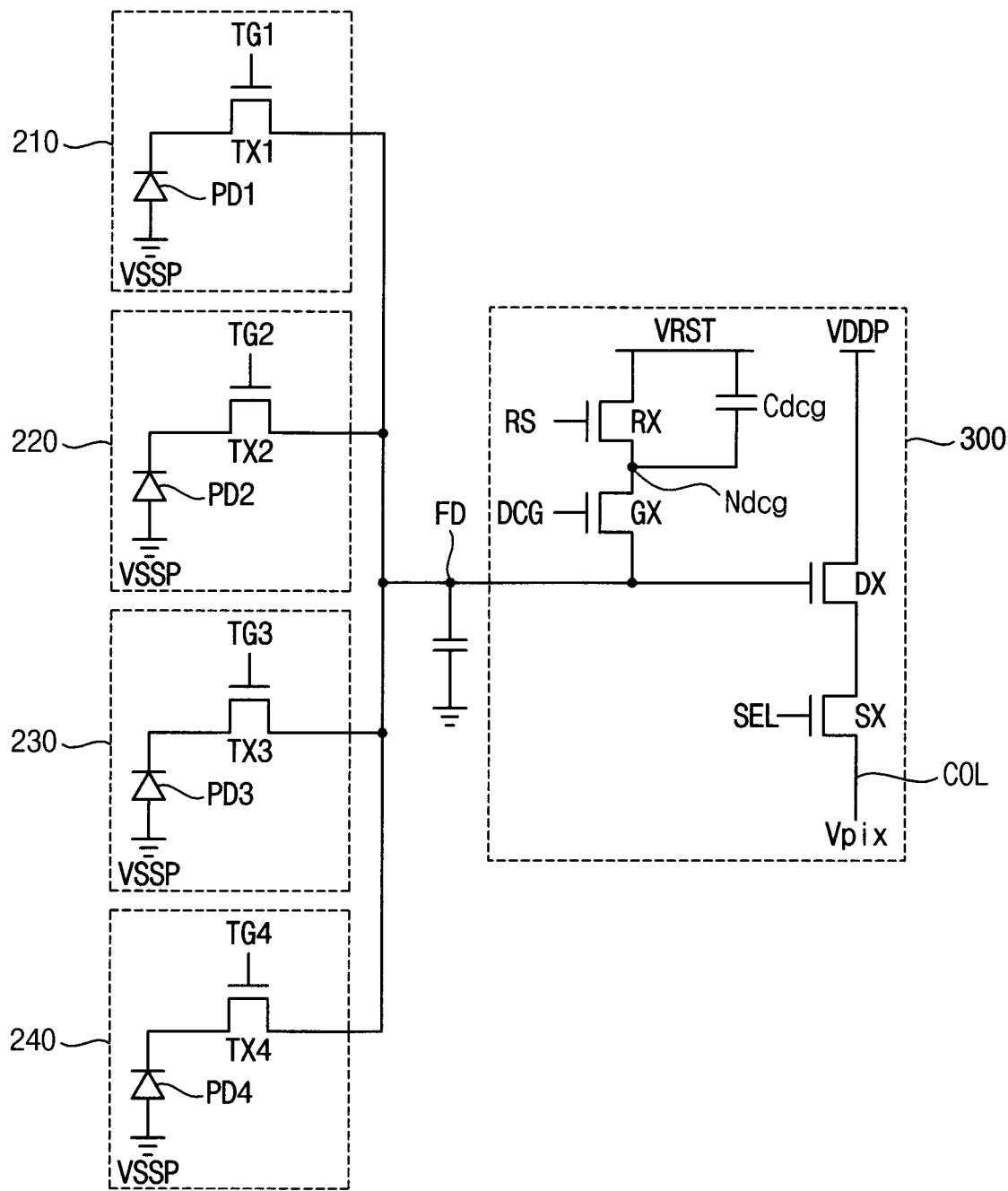
FIG. 9 is a circuit diagram illustrating a shared structure in which four pixels are commonly connected to a single floating diffusion node, according to an exemplary embodiment of the inventive concept.
Figure 10:
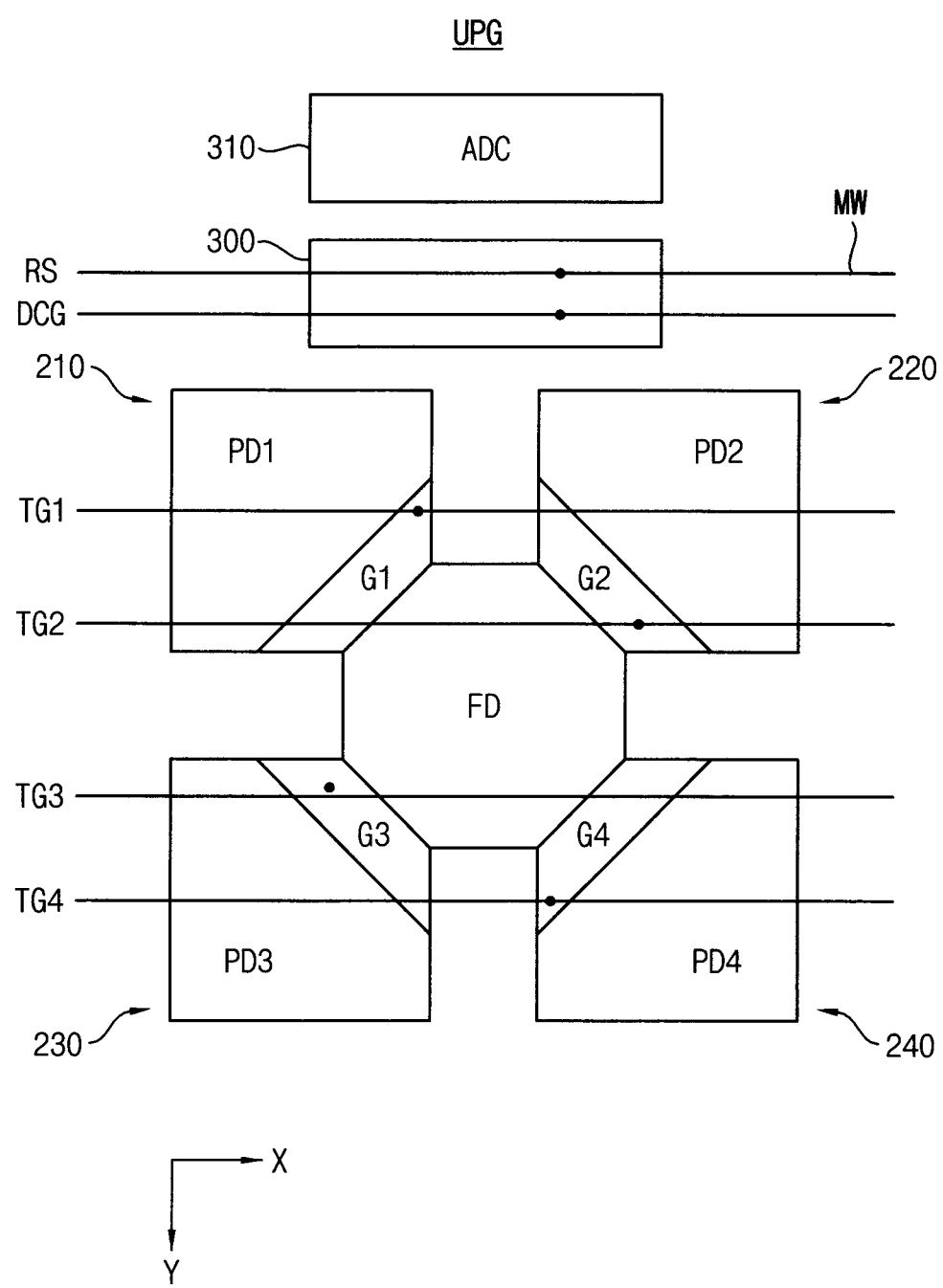
FIG. 10 is a top view illustrating an example layout of the shared structure of FIG. 9.

FIG. 9 is a circuit diagram illustrating a shared structure in which four pixels are commonly connected to a single floating diffusion node, according to an exemplary embodiment of the inventive concept, and FIG. 10 is a top view illustrating an example layout of the shared structure of FIG. 9.

Referring to FIGS. 9 and 10, a unit pixel group UPG may include a common floating diffusion node FD, a first pixel 210, a second pixel 220, a third pixel 230, a fourth pixel 240, a readout circuit 300 and/or an analog-to-digital conversion unit 310. The first pixel 210, the second pixel 220, the third pixel 230, and the fourth pixel 240 may be commonly connected to the common floating diffusion node FD. The unit pixel group UPG, as illustrated in FIGS. 9 and 10, may be arranged repeatedly in a row direction X and a column direction Y in a pixel array.

Control signals TG1, TG2, TG3, TG4, RS and DCG may be provided from the row driver (e.g., the row driver 30 in FIG. 6) to the unit pixel group UPG through wires MW extended in the row direction X.

The first pixel 210 may include a first photodiode PD1 and a first transfer transistor TX1. The second pixel 220 may include a second photodiode PD2 and a second transfer transistor TX2. The third pixel 230 may include a third photodiode PD3 and a third transfer transistor TX3. The fourth pixel 240 may include a fourth photodiode PD4 and a fourth transfer transistor TX4. In FIG. 10, G1~G4 indicate transfer gates of the first through fourth transfer transistors TX1~TX4, respectively.

The readout circuit 300 may include a reset transistor RX, a gain adjusting transistor GX, a capacitor Cdcg, a source follower transistor or a driving transistor DX, and/or a selection transistor SX. FIG. 9 illustrates a non-limiting example where each pixel includes one transistor and the readout circuit includes four transistors, but exemplary embodiments of the inventive concept may be applied to operate an image sensor of various configurations other than that of FIG. 9.

The reset transistor RX may be connected between a reset voltage VRST and a gain adjusting node Ndcg and the reset transistor RX may be turned on and off in response to a reset signal RS. The gain adjusting transistor GX may be connected between the gain adjusting node Ndcg and the common floating diffusion node FD and the gain adjusting transistor GX may be turned on and off in response to a gain adjusting signal DCG. The capacitor Cdcg may be connected in parallel with the reset transistor RX between the reset voltage VRST and the gain adjusting node Ndcg. As will be described with reference to FIG. 11, different gains may be implemented using the gain adjusting transistor CX and the capacitor Cdcg.

Figure 11:
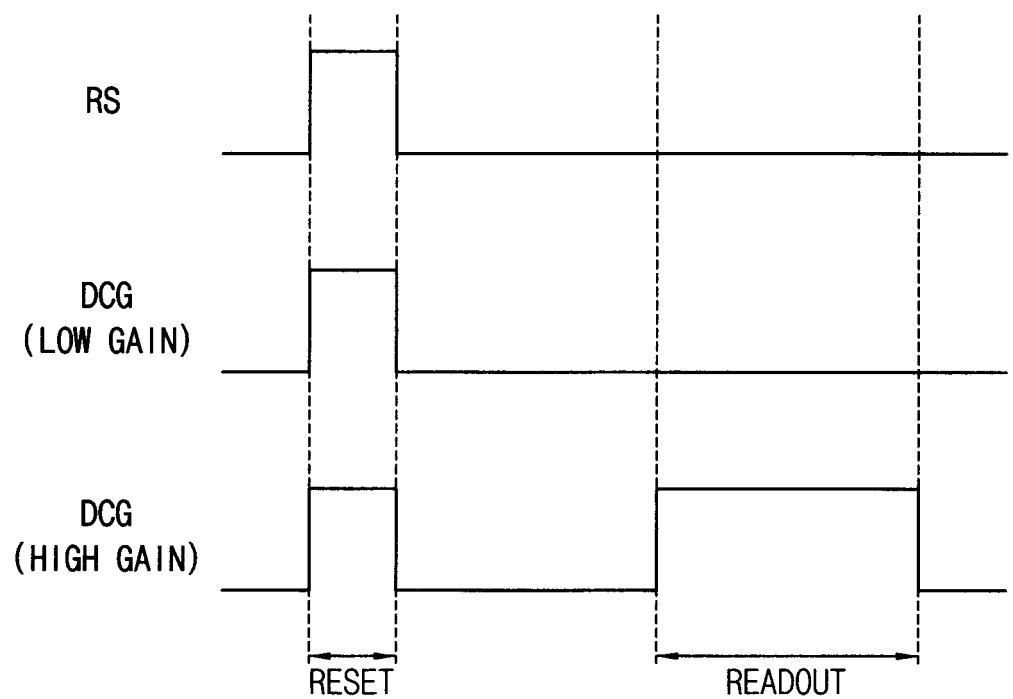
FIG. 11 is a timing diagram illustrating an example operation in the shared structure of FIG. 9.

FIG. 11 is a timing diagram illustrating an example operation in the shared structure of FIG. 9.

Referring to FIGS. 9, 10 and 11, the reset transistor RX and the gain adjusting transistor GX may be turned on when the common floating diffusion node FD is reset. The reset transistor RX may be turned off and the gain adjusting transistor GX may be turned on when a voltage of the common floating diffusion node FD is read out with a first gain (e.g., low gain). The reset transistor RX and the gain adjusting transistor GX may be turned off when the voltage of the common floating diffusion node FD is read out with a second gain (e.g., high gain) higher than the first gain.

The pixel signal Vpix output from the pixel array may include a shot noise that increases according to an ambient light and a circuit noise caused by characteristics of internal circuits of the pixel array. Even though the gain of the pixel is increased using the gain adjusting transistor GX and the capacitor Cdcg as illustrated in FIG. 9, and the noise is increased, the increase of the signal-to-noise ratio (SNR) is insignificant.

According to exemplary embodiments of the inventive concept, the shot noise and/or the circuit noise of the target color pixels (e.g., the blue color pixels) may be reduced and the sensing sensitivity of the target color pixels may be enhanced.

Figure 12:
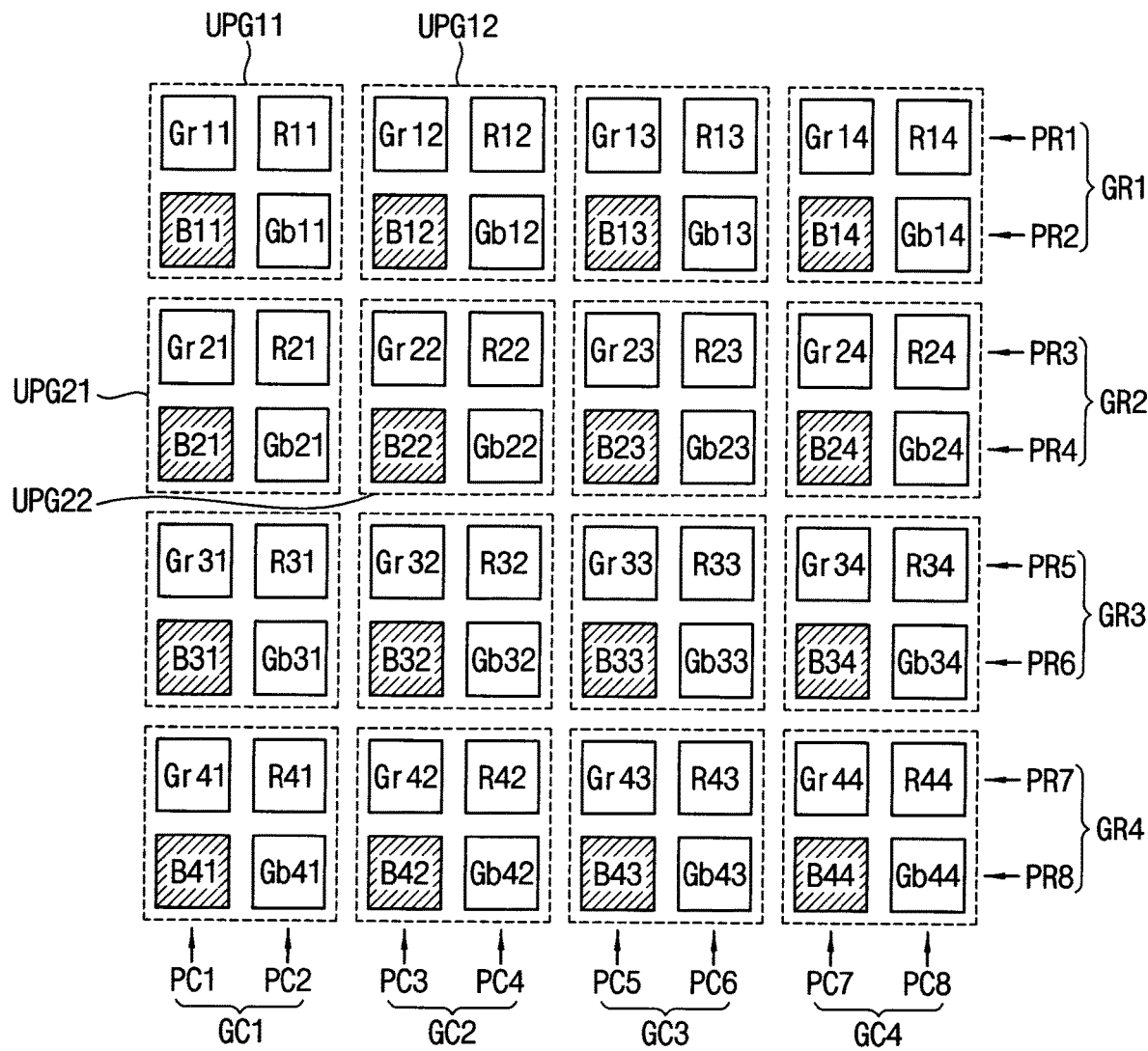
FIG. 12 is a diagram illustrating a layout of a pixel array included in an image sensor according to exemplary embodiments of the inventive concept.

FIG. 12 is a diagram illustrating an example embodiment of a layout of a pixel array included in an image sensor according to exemplary embodiments of the inventive concept.

FIG. 12 illustrates first green pixels Gr11~Gr44, second green pixels Gb11~Gb44, blue pixels B11~B44 and red pixels R11~R44, which are arranged repeatedly in the row direction X and the column direction Y in the Bayer pattern. The colors of the pixels may be implemented using a color filter array disposed above the pixels.

FIG. 12 illustrates only first through fourth group rows GR1~GR4 including first through eighth pixel rows PR1~PR8 and first through fourth group columns GC1~GC4 including first through eighth pixel columns PC1~PC8 for convenience of illustration, but the inventive concept is not limited thereto.

Referring to FIG. 12, a plurality of pixels in a pixel array may be grouped into a plurality of unit pixel groups UPG11~UPG44 such that each unit pixel group UPGij (i=1~4, j=1~4) includes one red pixel Rij, two green pixels Grij and Gbij and one blue pixel Bij. Here, "unit pixel group" indicates a minimum set of pixels that may not be further split into the smaller set in the repeated arrangement pattern of pixels.

In some exemplary embodiments of the inventive concept, each unit pixel group UPGij may have a shared structure of one red pixel Rij, two green pixels Grij and Gbij and one blue pixel Bij that are electrically connected to one common floating diffusion node through respective transfer gates, as described with reference to FIGS. 9 and 10.

In some exemplary embodiments of the inventive concept, each unit pixel group UPGij may have a non-shared structure of one red pixel Rij, two green pixels Grij and Gbij and one blue pixel Bij such that each pixel has a dedicated floating diffusion node, as described with reference to FIG. 7.

Figure 13:
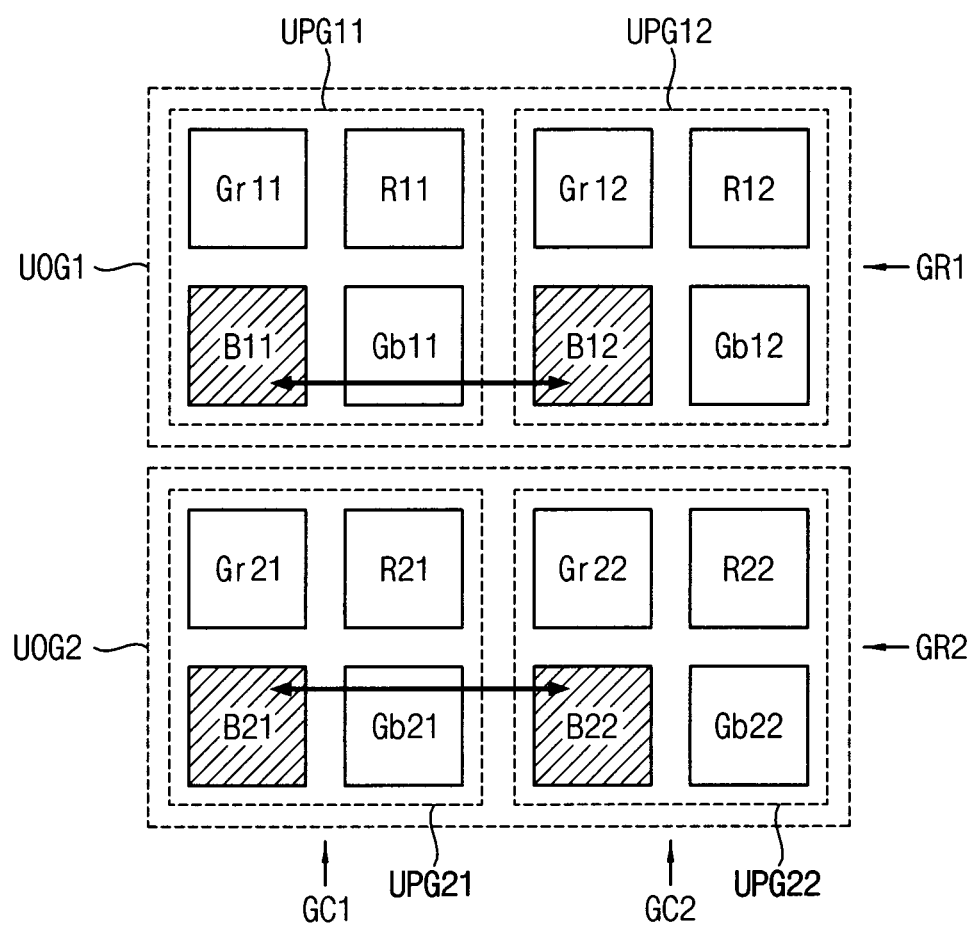
FIGS. 13, 14 and 15 are diagrams for describing an exemplary embodiment of the inventive concept for a method of controlling sensing sensitivity of an image sensor having the shared structure of FIG. 9 and the layout of FIG. 12.
Figure 14:
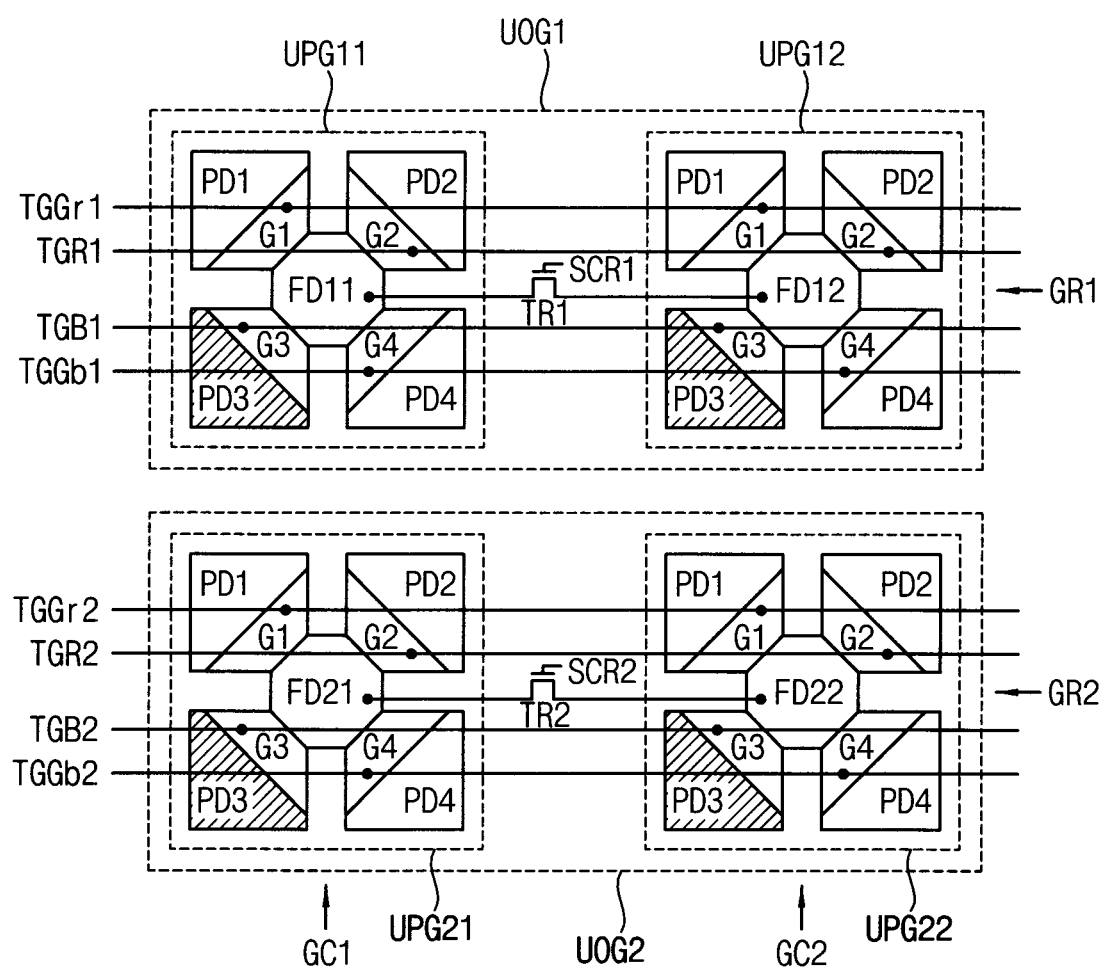
Figure 15:
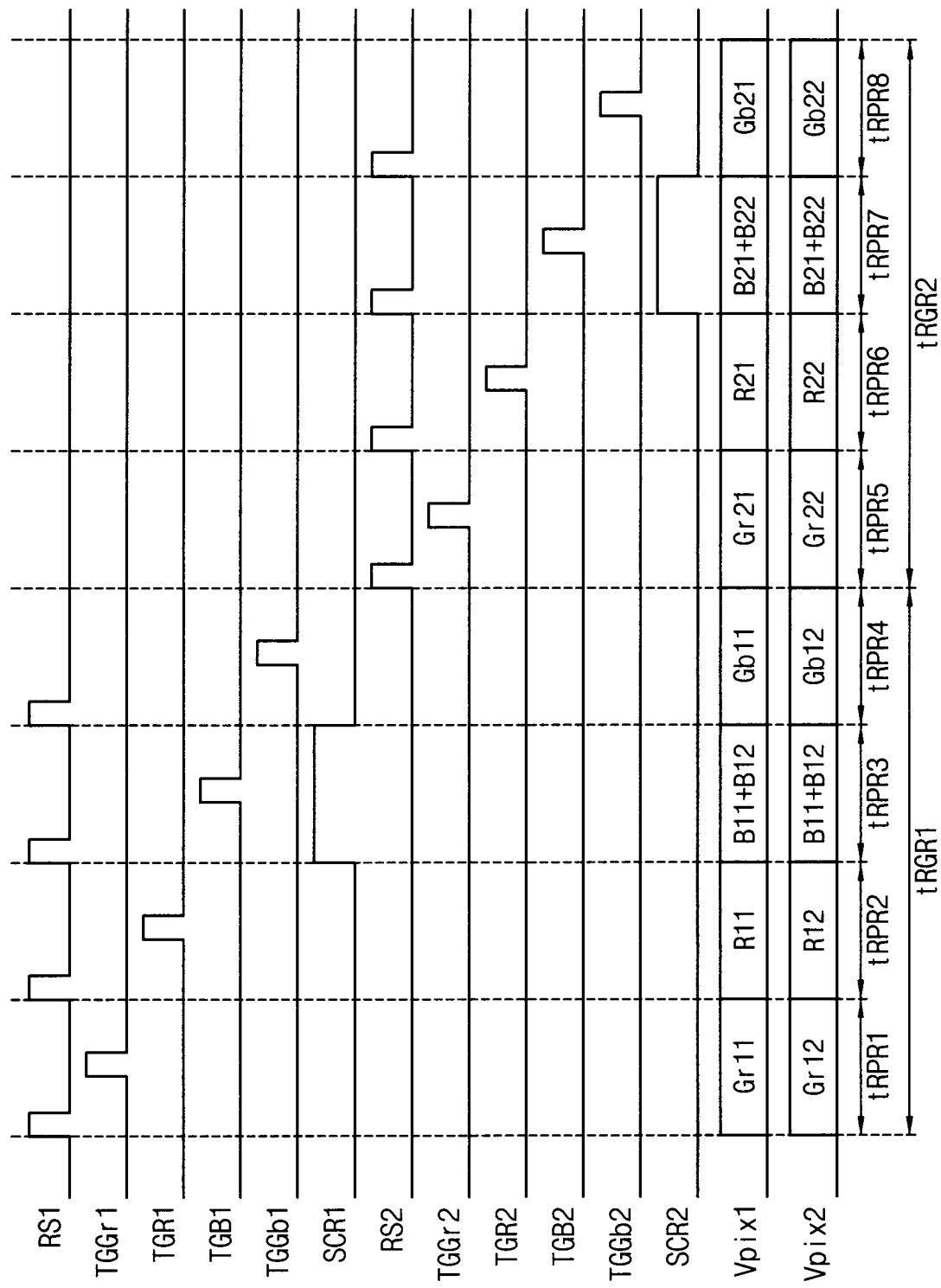

FIGS. 13, 14 and 15 are diagrams for describing an exemplary embodiment of the inventive concept for a method of controlling sensing sensitivity of an image sensor having the shared structure of FIG. 9 and the layout of FIG. 12.

FIGS. 13 and 14 illustrate a portion of the pixel array of FIG. 12, in other words, the first unit pixel group UPG11, a second unit pixel group UPG12, a third unit pixel group UPG21 and a fourth unit pixel group UPG22.

Referring to FIGS. 13 and 14, the first unit pixel group UPG11 and the second unit pixel group UPG12 may form a first unit operation group UOG1, and the third unit pixel group UPG21 and the fourth unit pixel group UPG22 may form a second unit operation group UOG2. As such, the plurality of unit pixel groups may be grouped into a plurality of unit operation groups such that each unit operation group includes two unit pixel groups that are adjacent to each other in the row direction X. Here, "unit operation group" indicates a minimum set of pixels that perform the same and simultaneous sensing operation and may not be further split into the smaller set in the repeated arrangement pattern of pixels.

The arrows in FIG. 13 represent that charge sharing is performed during the sensing operation between two pixels corresponding to both ends of each arrow. In other words, the charge sharing may be performed during the sensing operation between the two blue pixels B11 and B12 in the first unit operation group UOG1 and between the two blue pixels B21 and B22 in the second unit operation group UOG2.

Referring to FIG. 14, in the first unit operation group UOG1, a first green transfer control signal TGGr1, a red transfer control signal TGR1, a blue transfer control signal TGB1, and a second green transfer control signal TGGb1 may be applied to the transfer gates G1 of the first green pixels, the transfer gates G2 of the red pixels, the transfer gates G3 of the blue pixels and the transfer gates G4 of the second green pixels, respectively.

In the second unit operation group UOG2, a first green transfer control signal TGGr2, a red transfer control signal TGR2, a blue transfer control signal TGB2, and a second green transfer control signal TGGb2 may be applied to the transfer gates G1 of the first green pixels, the transfer gates G2 of the red pixels, the transfer gates G3 of the blue pixels and the transfer gates G4 of the second green pixels, respectively.

Using such transfer control signals TGGr1, TORI, TGB1, TGGb1, TGGr2, TGR2, TGB2 and TGGb2, each of the photo diodes PD1, PD2, PD3 and PD4 may be electrically connected to the common diffusion nodes FD11, FD12, FD21 and FD22, respectively, to transfer the photo-charged collected by each photo diode.

As illustrated in FIG. 14, the pixel array may include a row node connection switch connected between two common floating diffusion nodes included in each unit operation group. In other words, the first unit operation group UOG1 may include a first row node connection switch TR1 connected between the two common floating diffusion nodes FD11 and FD12. The first row node connection switch TR1 may be turned on in response to a first row sharing control signal SCR1. The second unit operation group UOG2 may include a second row node connection switch TR2 connected between the two common floating diffusion nodes FD21 and FD22. The second row node connection switch TR2 may be turned on in response to a second row sharing control signal SCR2.

As will be described below with reference to FIG. 15, the row node connection switches TR1 and TR2 may be turned on when the sensing operation of the blue pixels is performed, so that the photo-charge collected by the two blue pixels in the same unit operation group may be summed or shared.

FIG. 15 is a timing diagram illustrating a first row sensing period tRGR1 corresponding to the first group row GR1 and a second row sensing period tRGR2 corresponding to the second group row GR2.

The operation of the pixels during each of first through eighth sensing periods tRPR1~tRPR8 is the same as described with reference to FIG. 8, and thus, repeated descriptions may be omitted. The transfer control signals TGGr1, TGR1, TGB1, TGGb1, TGGr2, TGR2, TGR2 and TGGb2, the row sharing control signals SCR1 and SCR2, and the reset signals RS1 and RS2 may be provided from the row driver 30 under the control of the controller 60 in FIG. 6. The first pixel signal Vpix1 may be provided through the column line of the first group column GC1, and the second pixel signal Vpix2 may be provided through the column line of the second group column GC2.

Referring to FIGS. 13, 14 and 15, in the first sensing period tRPR1, according to activation of the reset signal RS1 (e.g., the reset signal RS1 of a high level) and the first green transfer control signal TGGr1 (e.g., the first green transfer control signal TGGr1 of a high level), the first pixel signal Vpix1 has a voltage level corresponding to the photo-charge collected by the first green pixel Gr11 and the second pixel signal Vpix2 has a voltage level corresponding to the photo-charge collected by the first green pixel Gr12.

In the second sensing period tRPR2, according to activation of the reset signal RS1 and the red transfer control signal TGR1, the first pixel signal Vpix1 has a voltage level corresponding to the photo-charge collected by the red pixel R11 and the second pixel signal Vpix2 has a voltage level corresponding to the photo-charge collected by the red pixel R12.

In the third sensing period tRPR3, the first row sharing control signal SCR1 is activated (e.g., the first row sharing control signal SCR1 has a high level) and the first row node connection switch TR1 is turned on to electrically connect the two common floating diffusion nodes FD11 and FD12 in the first unit operation group UOG1. According to activation of the reset signal RS1 and the blue transfer control signal TGB1, each of the first pixel signal Vpix1 and the second pixel signal Vpix2 has a voltage level corresponding to the sum of the photo-charge collected by the two blue pixels B11 and B12, in other words, B11+B12.

In the fourth sensing period tRPR4, according to activation of the reset signal RS1 and the second green transfer control signal TGGb1 (e.g., the second green transfer control signal TGGb1 has a high level), the first pixel signal Vpix1 has a voltage level corresponding to the photo-charge collected by the second green pixel Gb11 and the second pixel signal Vpix2 has a voltage level corresponding to the photo-charge collected by the second green pixel Gb12.

In the fifth sensing period tRPR5, according to activation of the reset signal RS2 (e.g., the reset signal RS2 has a high level) and the first green transfer control signal TGGr2 (e.g., the first green transfer control signal TGGr2 has a high level), the first pixel signal Vpix1 has a voltage level corresponding to the photo-charge collected by the first green pixel Gr21 and the second pixel signal Vpix2 has a voltage level corresponding to the photo-charge collected by the first green pixel Gr22.

In the sixth sensing period tRPR6, according to activation of the reset signal RS2 and the red transfer control signal TGR2 (e.g., the red transfer control signal TGR2 has a high level), the first pixel signal Vpix1 has a voltage level corresponding to the photo-charge collected by the red pixel R21 and the second pixel signal Vpix2 has a voltage level corresponding to the photo-charge collected by the red pixel R22.

In the seventh sensing period tRPR7, the second row sharing control signal SCR2 is activated (e.g., the second row sharing control signal SCR2 has a high level) and the second row node connection switch TR2 is turned on to electrically connect the two common floating diffusion nodes FD21 and FD22 in the second unit operation group UOG2. According to activation of the reset signal RS2 and the blue transfer control signal TGB2 (e.g., the blue transfer control signal TGB2 has a high level), each of the first pixel signal Vpix1 and the second pixel signal Vpix3 has a voltage level corresponding to the sum of the photo-charge collected by the two blue pixels B21 and B22, in other words, B21+B22.

In the eighth sensing period tRPR8, according to activation of the reset signal RS2 and the second green transfer control signal TGGb2 (e.g., the second green transfer control signal TGGb2 has a high level), the first pixel signal Vpix1 has a voltage level corresponding to the photo-charge collected by the second green pixel Gb21 and the second pixel signal Vpix2 has a voltage level corresponding to the photo-charge collected by the second green pixel Gb22.

Hereinafter, the description repeated with FIGS. 13, 14 and 15 may be omitted.

Figure 16:
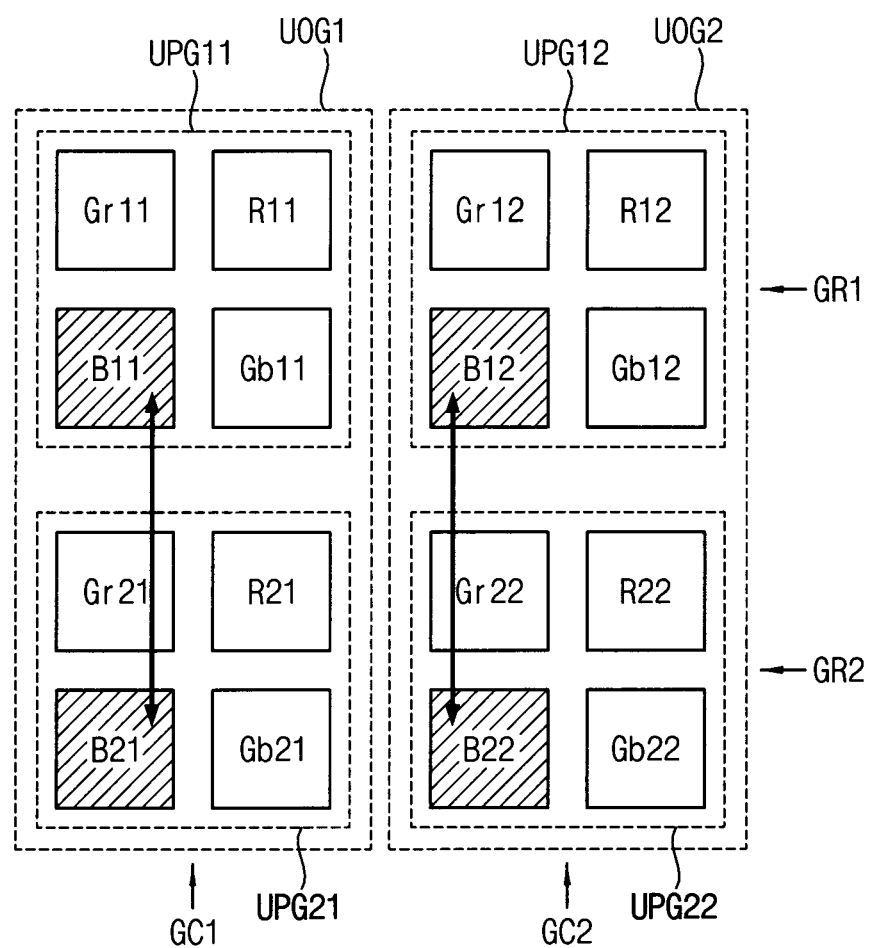
FIGS. 16, 17 and 18 are diagrams for describing an exemplary embodiment of the inventive concept for a method of controlling sensing sensitivity of an image sensor having the shared structure of FIG. 9 and the layout of FIG. 12.
Figure 17:
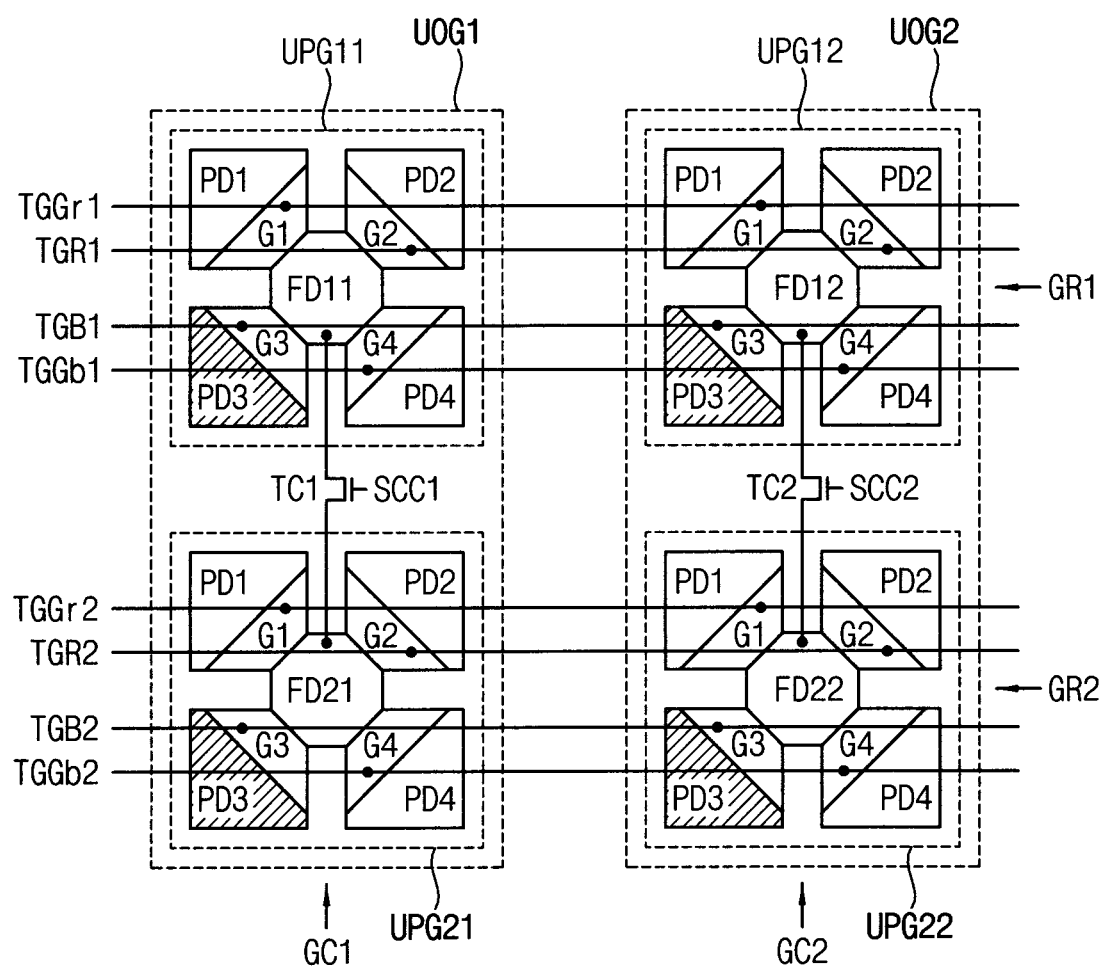
Figure 18:
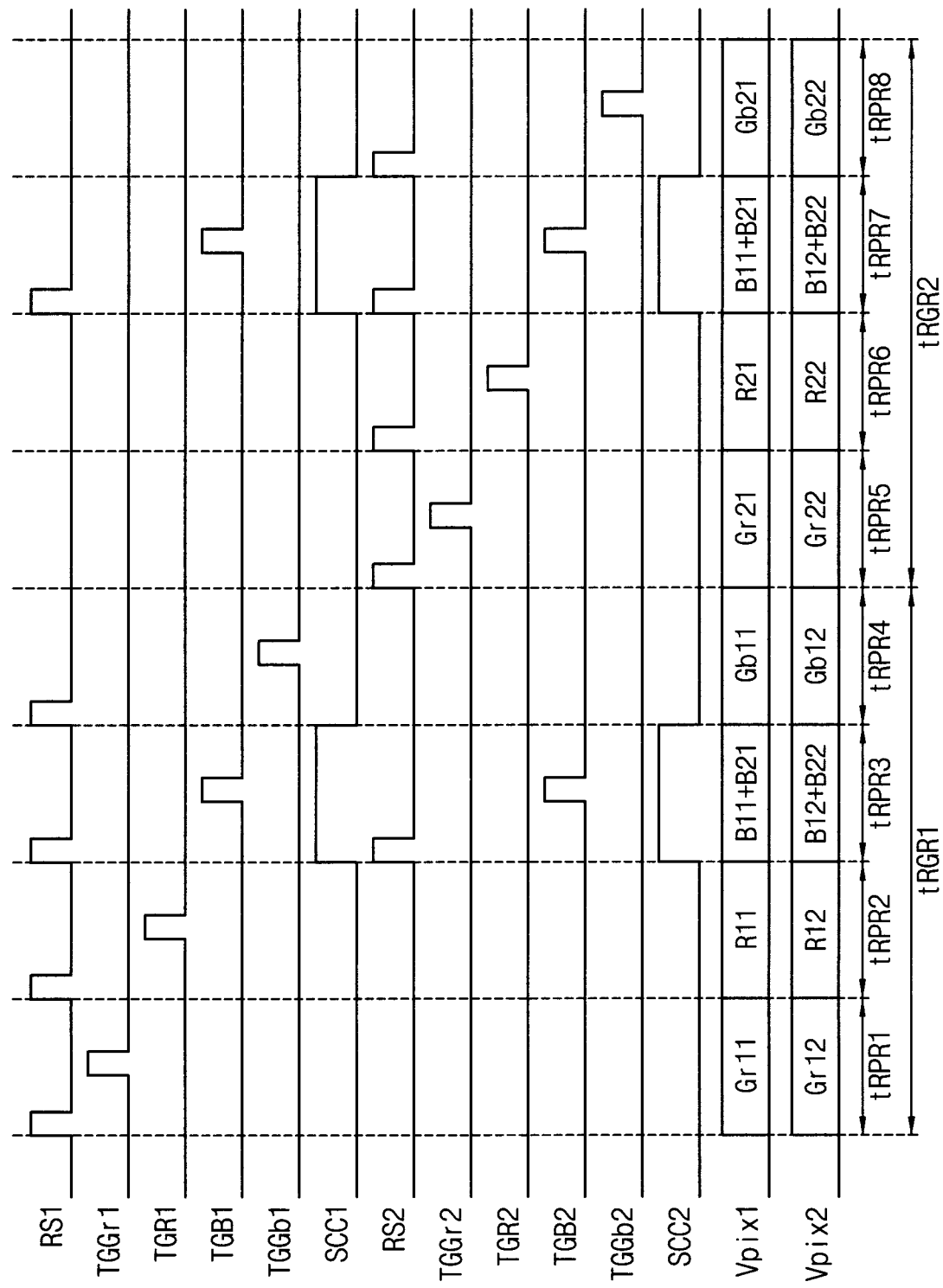

FIGS. 16, 17 and 18 are diagrams for describing an exemplary embodiment of the inventive concept for a method of controlling sensing sensitivity of an image sensor having the shared structure of FIG. 9 and the layout of FIG. 12.

Referring to FIGS. 16 and 17, the first unit pixel group UPG11 and the third unit pixel group UPG21 may form a first unit operation group UOG1, and the second unit pixel group UPG12 and the fourth unit pixel group UPG22 may form a second unit operation group UOG2. As such, the plurality of unit pixel groups may be grouped into a plurality of unit operation groups such that each unit operation group includes two unit pixel groups that are adjacent to each other in the column direction Y.

The arrows in FIG. 16 represent that charge sharing is performed during the sensing operation between two pixels corresponding to both ends of each arrow. In other words, the charge sharing may be performed during the sensing operation between the two blue pixels B11 and B21 in the first unit operation group UOG1 and between the two blue pixels B12 and B22 in the second unit operation group UOG2.

As illustrated in FIG. 17, the pixel array may include a column node connection switch connected between two common floating diffusion nodes included in each unit operation group. In other words, the first unit operation group UOG1 may include a first column node connection switch TC1 connected between the two common floating diffusion nodes FD11 and FD21. The first column node connection switch TC1 may be turned on in response to a first column sharing control signal SCC1. The second unit operation group UOG2 may include a second column node connection switch TC2 connected between the two common floating diffusion nodes FD12 and FD22. The second column node connection switch TC2 may be turned on in response to a second column sharing control signal SCC2.

The timing diagram of FIG. 18 is substantially the same as that of FIG. 15, except that the row sharing control signals SCR1 and SCR2 are replaced with the column sharing control signals SCC1 and SCC2, and thus, repeated descriptions may be omitted. In addition, the third sensing period tRPR3 and the seventh sensing period tRPR7 of FIG. 18 have differences compared to the third sensing period tRPR3 and the seventh sensing period tRPR7 of FIG. 15.

Referring to FIGS. 16, 17 and 18, in the third sensing period tRPR3, the first column sharing control signal SCC1 is activated and the first column node connection switch TC1 is turned on to electrically connect the two common floating diffusion nodes FD11 and FD21 in the first unit operation group UOG1. In addition, the second column sharing control signal SCC2 is activated and the second column node connection switch TC2 is turned on to electrically connect the two common floating diffusion nodes FD12 and FD22 in the second unit operation group UOG2. The activated first and second column sharing control signals SCC1 and SCC2 overlap in the third sensing period tRPR3. According to activation of the reset signals RS1 and RS2 and the blue transfer control signals TGB1 and TGB2 and the above-described charge sharing, the first pixel signal Vpix1 has a voltage level corresponding to the sum of photo-charge collected by the two blue pixels B11 and B21, e.g., B11+B21, and the second pixel signal Vpix2 has a voltage level corresponding to the sum of the photo-charge collected by the two blue pixels B12 and B22, e.g., B12+B22.

In the seventh sensing period tRPR7, the second column sharing control signal SCC2 is activated and the second column node connection switch TC2 is turned on to electrically connect the two common floating diffusion nodes FD12 and FD22 in the second unit operation group UOG2. In addition, the first column sharing control signal SCC1 is activated and the first column node connection switch TC1 is turned on to electrically connect the two common floating diffusion nodes FD11 and FD21 in the first unit operation group UOG1. The activated first and second column sharing control signals SCC1 and SCC2 overlap in the seventh sensing period tRPR7. According to activation of the reset signals RS1 and RS2 and the blue transfer control signals TGB1 and TGB2 and the above-described charge sharing, the first pixel signal Vpix1 has a voltage level corresponding to the sum of photo-charge collected by the two blue pixels B11 and B21, e.g., B11+B21, and the second pixel signal Vpix2 has a voltage level corresponding to the sum of the photo-charge collected by the two blue pixels B12 and B22, e.g., B12+B22.

In some exemplary embodiments of the inventive concept, the first column sharing control signal SCC1 and the second column sharing control signal SCC2 may be implemented as the same single signal.

Figure 19:
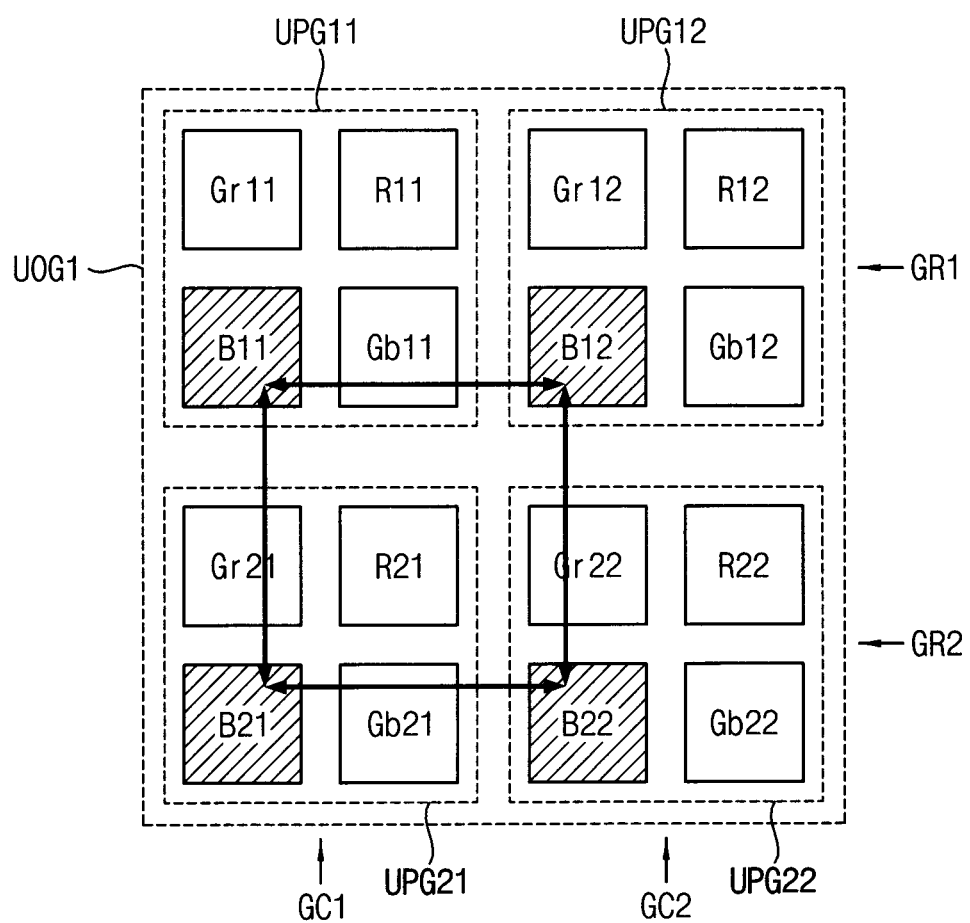
FIGS. 19, 20 and 21 are diagrams for describing an exemplary embodiment of the inventive concept for a method of controlling sensing sensitivity of an image sensor having the shared structure of FIG. 9 and the layout of FIG. 12.
Figure 20:
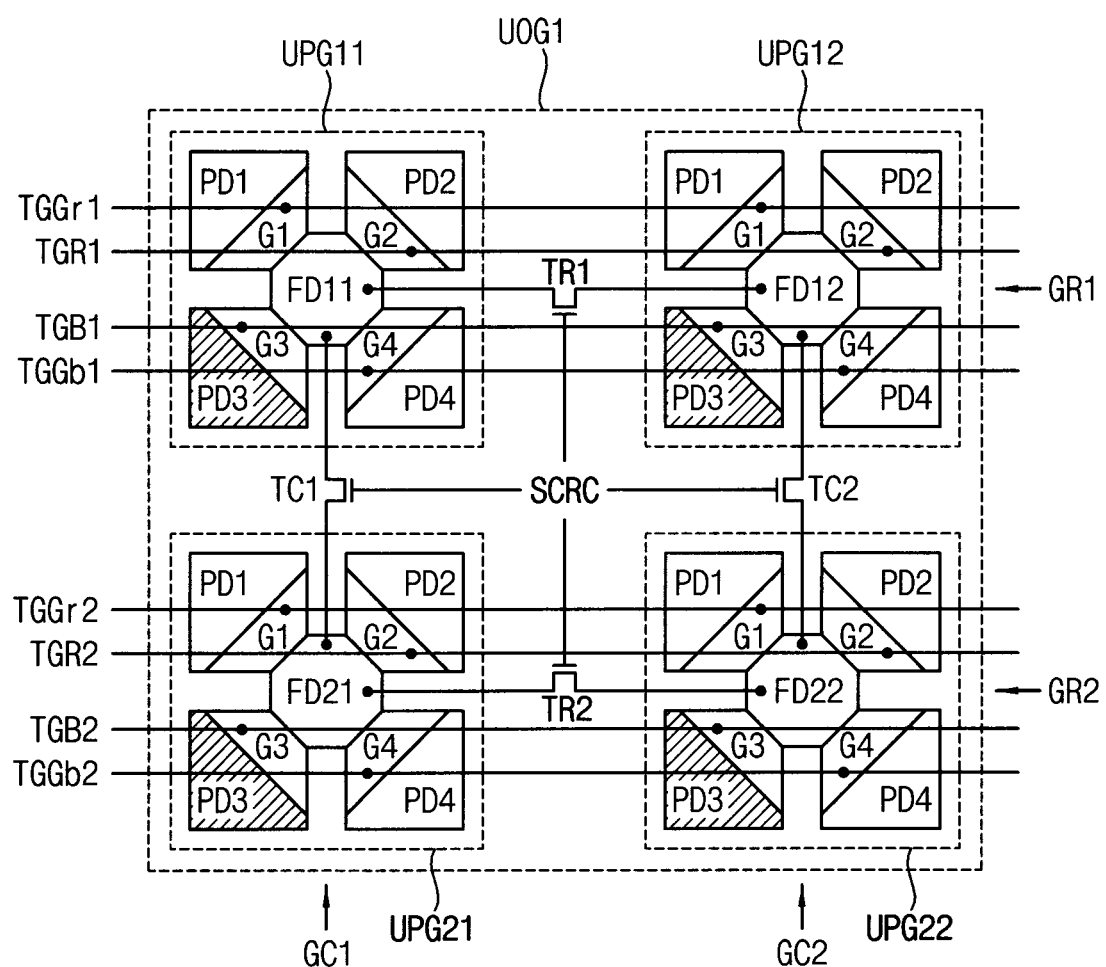
Figure 21:
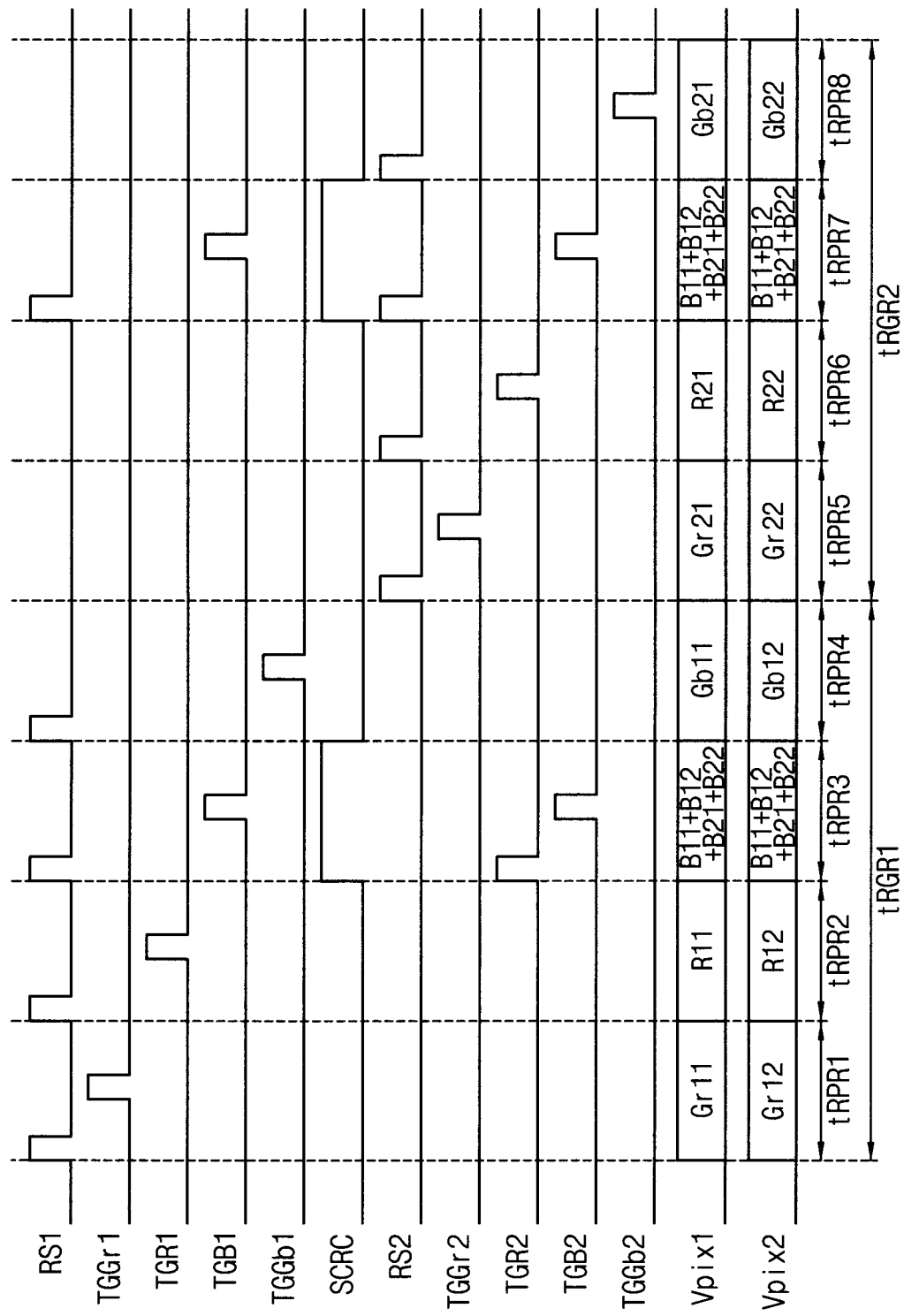

FIGS. 19, 20 and 21 are diagrams for describing an exemplary embodiment of the inventive concept for a method of controlling sensing sensitivity of an image sensor having the shared structure of FIG. 9 and the layout of FIG. 12.

Referring to FIGS. 19 and 20, the first unit pixel group UPG11, the second unit pixel group UPG12, the third unit pixel group UPG21 and the fourth unit pixel group UPG22 may form one unit operation group UOG1. As such, the plurality of unit pixel groups may be grouped into a plurality of unit operation groups such that each unit operation group includes four unit pixel groups that are adjacent to each other in the row direction X and in the column direction Y.

The arrows in FIG. 19 represent that charge sharing is performed during the sensing operation between four pixels corresponding to ends of the arrows. In other words, the charge sharing may be performed during the sensing operation between the four blue pixels B11, B12, B21 and B22 in the unit operation group UOG1.

As illustrated in FIG. 20, the pixel array may include at least one row node connection switch and at least one column node connection switch connected between four common floating diffusion nodes included in each unit operation group. For example, the unit operation group UOG1 may include row node connection switches TR1 and TR2 and column node connection switches TC1 and TC2 connected between the four common floating diffusion nodes FD11, FD12, FD21 and FD22 and turned on in response to a row-column sharing control signal SCRC.

The timing diagram of FIG. 21 is substantially the same as that of FIG. 15, except that the row sharing control signals SCR1 and SCR2 are replaced with the row-column sharing control signal SCRC, and thus, repeated descriptions may be omitted. In addition, the third sensing period tRPR3 and the seventh sensing period tRPR7 of FIG. 21 have differences compared to the third sensing period tRPR3 and the seventh sensing period tRPR7 of FIG. 15.

Referring to FIGS. 19, 20 and 21, in the third sensing period tRPR3 and the seventh sensing period tRPR7, the row-column sharing control signal SCRC is activated and the node connection switches TR1, TR2, TC1 and TC2 are turned on simultaneously to electrically connect the four common floating diffusion nodes FD11, FD12, FD21 and FD22 in the unit operation group UOG1. According to activation of the reset signals RS1 and RS2 and the blue transfer control signals TGB1 and TGB2 and the above-described charge sharing, each of the first pixel signal Vpix1 and the second pixel signal Vpix2 has a voltage level corresponding to the sum of photo-charge collected by the four blue pixels B11, B12, B21 and B22.

As described with reference to FIGS. 13 through 21, the sensing operation of the red pixels and the green pixels may be performed independently per each pixel, and the sensing operation of the blue pixels may be performed by summing the photo-charge collected by two or more blue pixels, to decrease the noises of the blue pixels and increase sensing sensitivity of the blue pixels.

Figure 22:
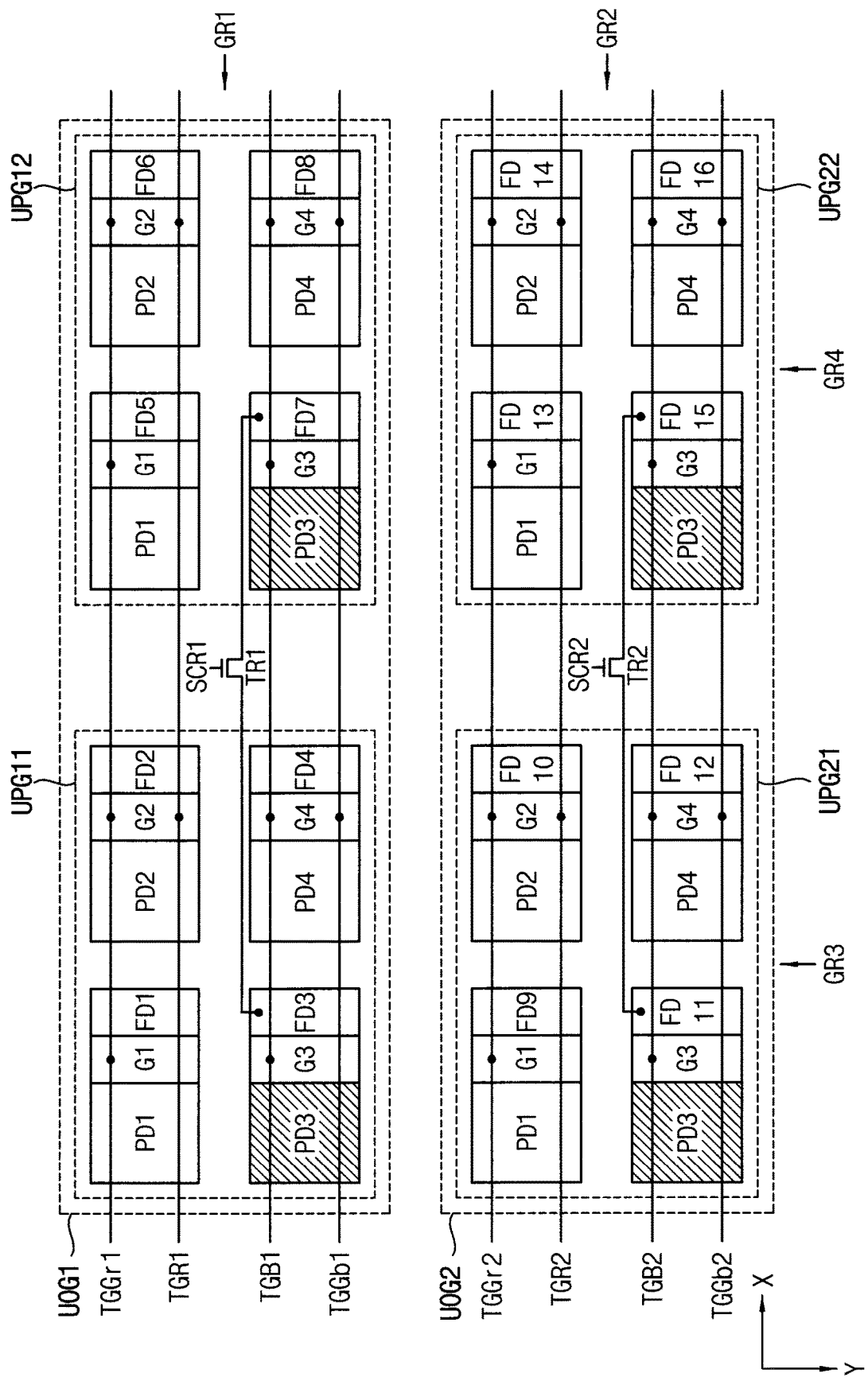
FIGS. 22, 23 and 24 are diagrams for describing an exemplary embodiment of the inventive concept for a method of controlling sensing sensitivity of an image sensor having a non-shared structure and the layout of FIG. 12.
Figure 23:
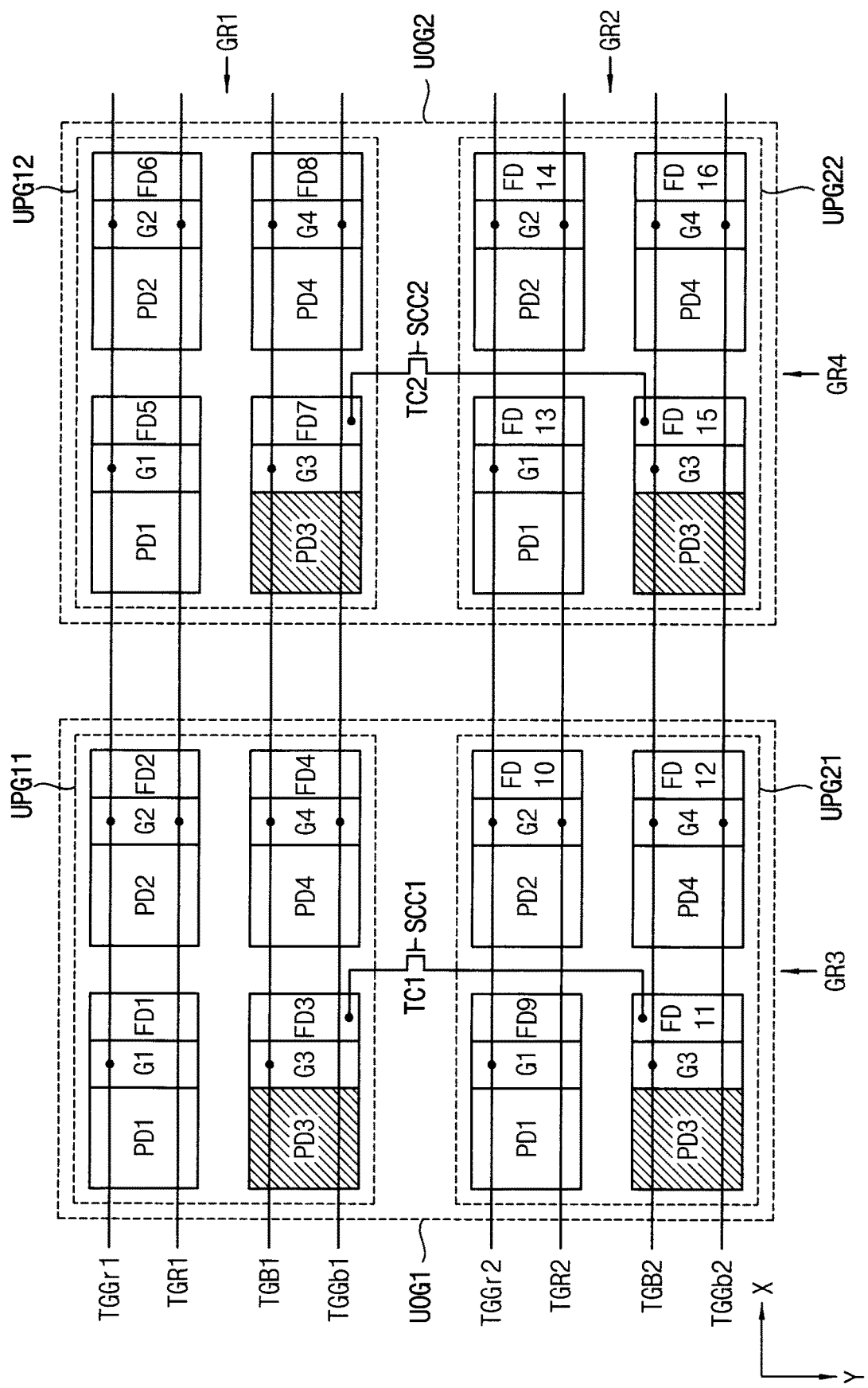
Figure 24:
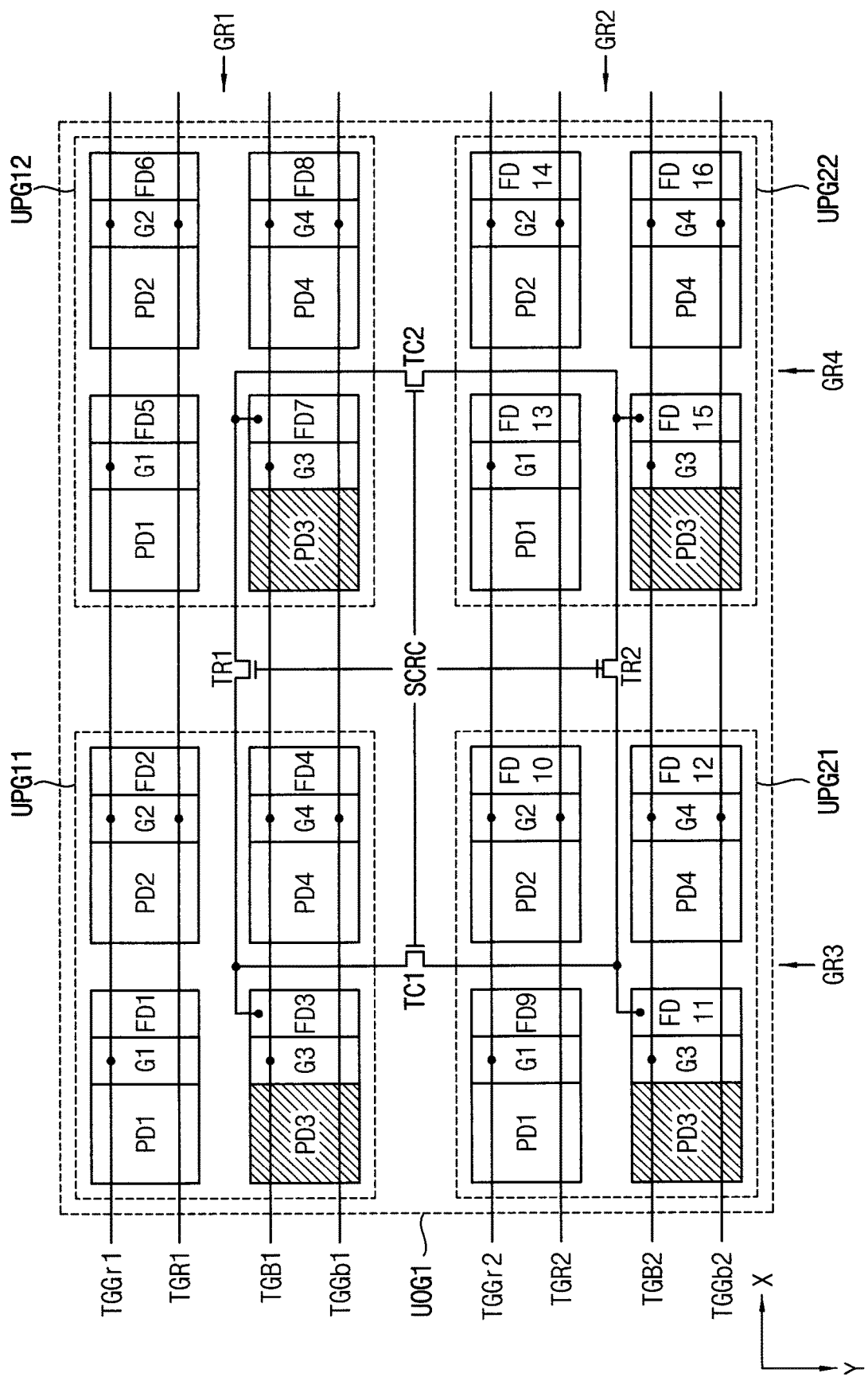

FIGS. 22, 23 and 24 are diagrams for describing an exemplary embodiment of the inventive concept for a method of controlling sensing sensitivity of an image sensor having a non-shared structure and the layout of FIG. 12.

In comparison with the shared structures of FIGS. 14, 17 and 20, color pixels include individual floating diffusion nodes FD1~FD16, respectively, in non-shared structures of FIGS. 22, 23 and 24. The descriptions are substantially the same as those of FIGS. 13 through 21 except the floating diffusion nodes, and thus repeated descriptions may be omitted.

Referring to FIG. 22, in the sensing operation of the blue pixels, the charge sharing may be performed between the two individual floating diffusion nodes FD3 and FD7 using a first row node connection switch TR1 responding to a first row sharing control signal SCR1, and between the two individual floating diffusion nodes FD11 and FD15 using a second row node connection switch TR2 responding to a second row sharing control signal SCR2, as described with reference to FIGS. 13, 14 and 15.

Referring to FIG. 23, in the sensing operation of the blue pixels, the charge sharing may be performed between the two individual floating diffusion nodes FD3 and FD11 using a first column node connection switch TC1 responding to a first column sharing control signal SCC1, and between the two individual floating diffusion nodes FD7 and FD15 using a second column node connection switch TC2 responding to a second column sharing control signal SCC2, as described with reference to FIGS. 16, 17 and 18.

Referring to FIG. 24, in the sensing operation of the blue pixels, the charge sharing may be performed between the four individual floating diffusion nodes FD3, FD7, FD11 and FD15 using row node connection switches TR1 and TR2 and column node connection switches TC1 and TC2 responding to a row-column sharing control signal SCRC.

Figure 25:
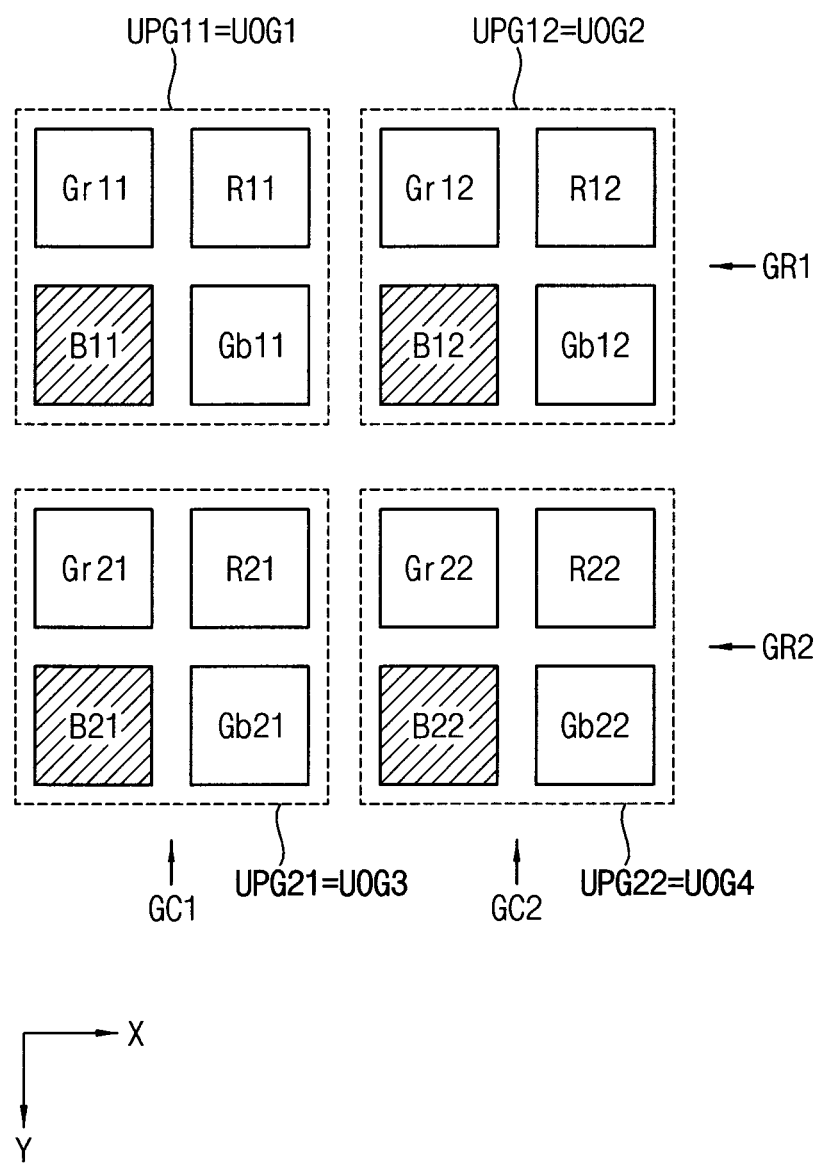
FIGS. 25, 26 and 27 are diagrams for describing an exemplary embodiment of the inventive concept for a method of controlling sensing sensitivity of an image sensor having the shared structure of FIG. 9 and the layout of FIG. 12.
Figure 26:
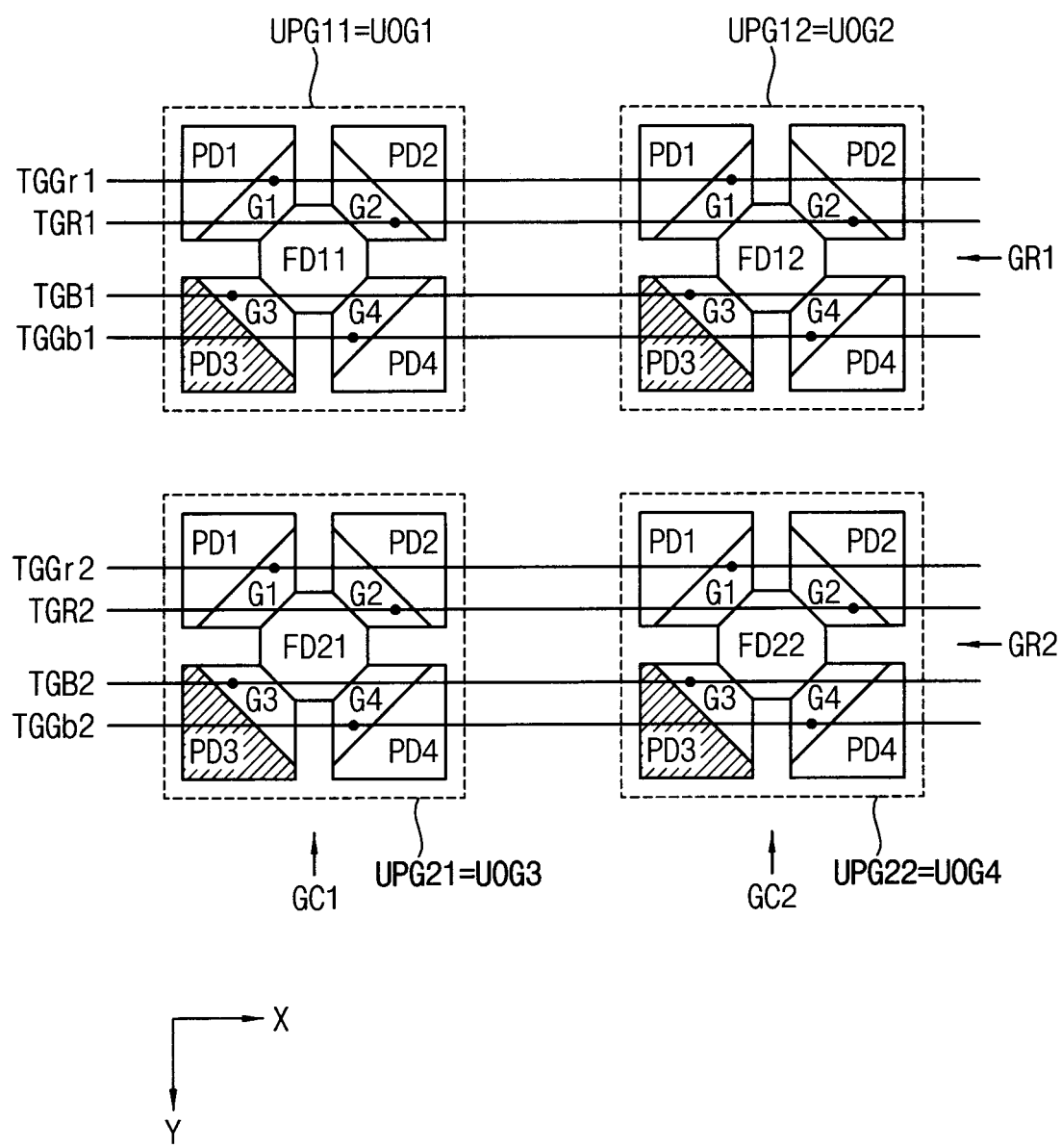
Figure 27:
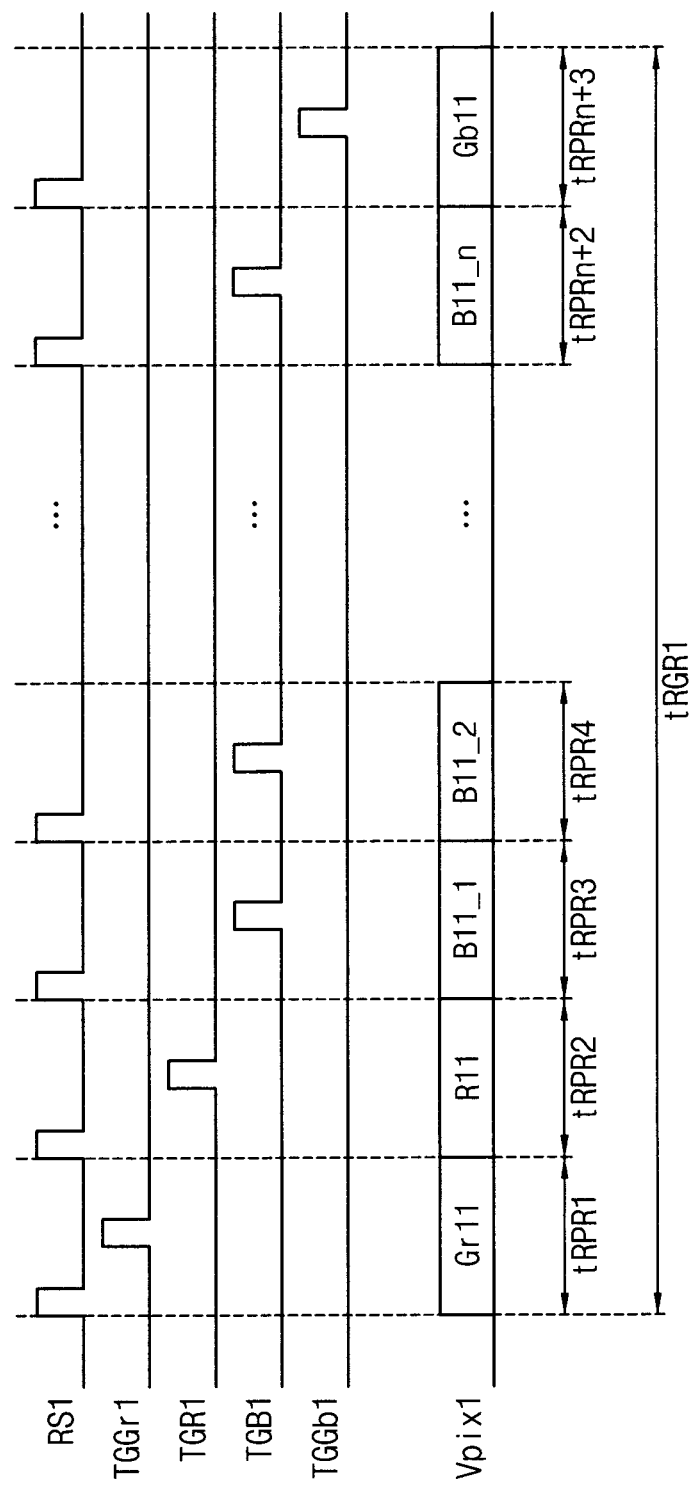

FIGS. 25, 26 and 27 are diagrams for describing an exemplary embodiment of the inventive concept for a method of controlling sensing sensitivity of an image sensor having the shared structure of FIG. 9 and the layout of FIG. 12. The descriptions repeated with FIGS. 13 through 21 may be omitted.

Referring to FIGS. 25 and 26, first through fourth unit pixel groups UPG11, UPG12, UPG21 and UPG22 may form first through fourth unit operation groups UOG1, UOG2, UOG3 and UOG4, respectively. As described above, "unit pixel group" indicates a minimum set of pixels that may not be further split into the smaller set in the repeated arrangement pattern of pixels, and "unit operation group" indicates a minimum set of pixels that perform the same and simultaneous sensing operation and may not be further split into the smaller set in the repeated arrangement pattern of pixels.

As will be described below with reference to FIG. 27, a multi-sampling operation may be performed such that the sensing operation to sample the photo-charge collected by the blue pixels is performed two or more times.

FIG. 27 is a timing diagram illustrating a first row sensing period tRGR1 corresponding to the first unit pixel group UPG11, in other words, the first unit operation group UOG1.

Referring to FIG. 27, in the first sensing period tRPR1, according to activation of the reset signal RS1 and the first green transfer control signal TGGr1, the first pixel signal Vpix1 has a voltage level corresponding to the photo-charge collected by the first green pixel Gr11.

In the second sensing period tRPR2, according to activation of the reset signal RS1 and the red transfer control signal TGR1, the first pixel signal Vpix1 has a voltage level corresponding to the photo-charge collected by the red pixel R11.

In each of the third through (n+2)-th sensing periods, according to activation of the reset signal RS1 and the blue transfer control signal TGB1, the first pixel signal Vpix1 has a voltage level corresponding to the photo-charge collected by the blue pixel B11. B11_1 through B11_$n$ in FIG. 27 indicate the n sampling results with respect to the blue pixel B11, where n is an integer greater than 1.

In the fourth sensing period tRPR4, according to activation of the reset signal RS1 and the second green transfer control signal TGGb1, the first pixel signal Vpix1 has a voltage level corresponding to the photo-charge collected by the second green pixel Gb11.

As such, the sensing operation of each blue pixel is performed two or more times whenever the sensing operation of each red pixel and each green pixel is performed once. Using the multiple sampling results B11_1 through B11_$n$, the circuit noise of the blue pixels may be reduced and the sensing sensitivity of the blue pixels may be enhanced.

Figure 28:
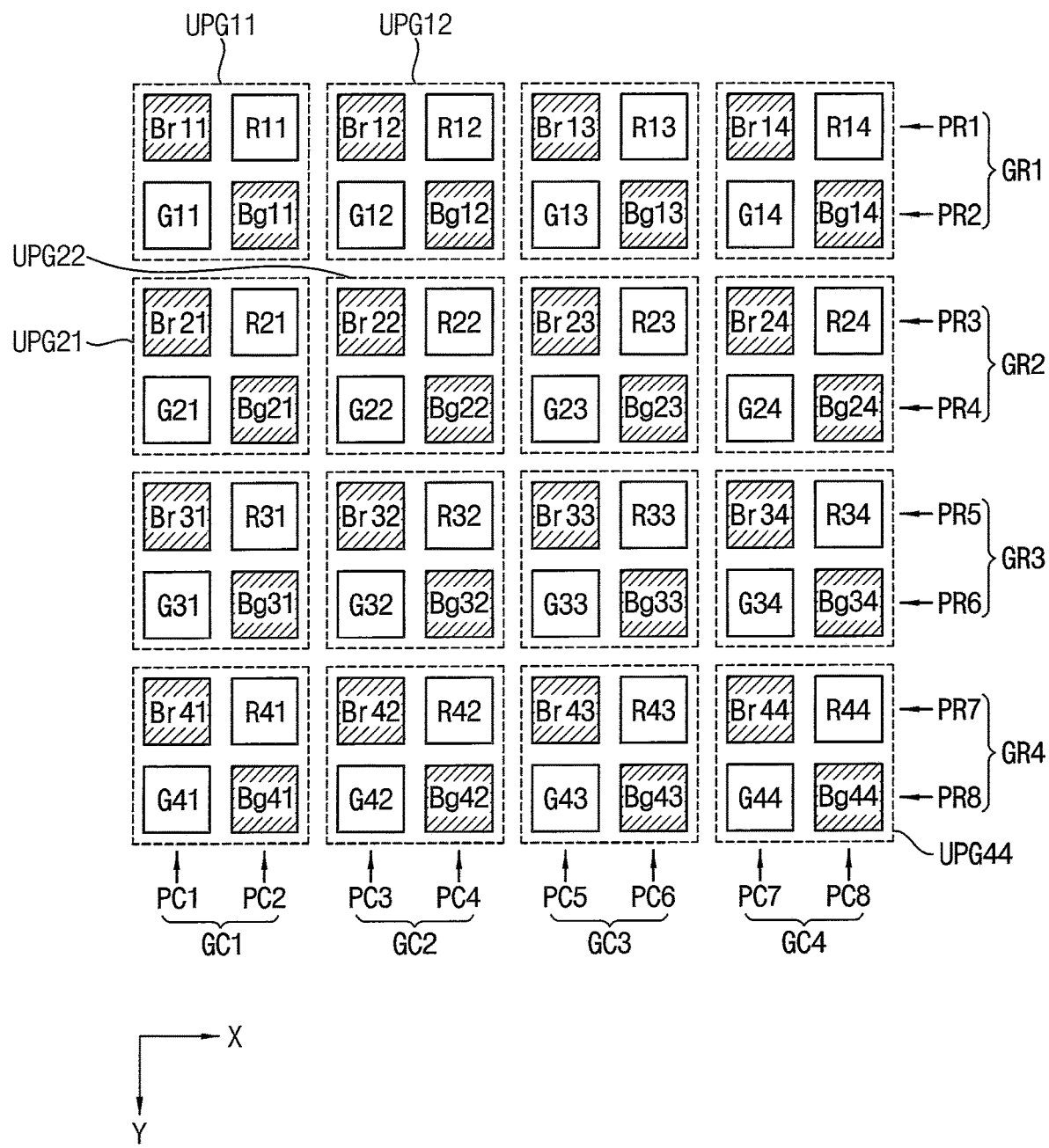
FIG. 28 is a diagram illustrating a layout of a pixel array included in an image sensor according to exemplary embodiments of the inventive concept.

FIG. 28 is a diagram illustrating a layout of a pixel array included in an image sensor according to exemplary embodiments of the inventive concept.

FIG. 28 illustrates first blue pixels Br11~Br44, a second blue pixels Bg11~Bg44, red pixels R11~R44 and green pixels G11~G44, which are arranged repeatedly in the row direction X and the column direction Y. The colors of the pixels may be implemented using a color filter array disposed above the pixels.

FIG. 28 illustrates only first through fourth group rows GR1~GR4 including first through eighth pixel rows PR1~PR8 and first through fourth group columns GC1~GC4 including first through eighth pixel columns PC1~PC8 for convenience of illustration, but inventive concept is not limited thereto.

Referring to FIG. 28, a plurality of pixels in a pixel array may be grouped into a plurality of unit pixel groups UPG11~UPG44 such that each unit pixel group UPGij (i=1~4, j=1~4) includes two blue pixels Brij and Bgij, one red pixel Rij and one green pixel Gij. Here, "unit pixel group" indicates a minimum set of pixels that may not be further split into the smaller set in the repeated arrangement pattern of pixels.

In some exemplary embodiments of the inventive concept, each unit pixel group UPGij may have a shared structure of two blue pixels Brij and Bgij, one red pixel Rij and one green pixel Gij that are electrically connected to one common floating diffusion node through respective transfer gates, as described with reference to FIGS. 9 and 10.

Figure 29:
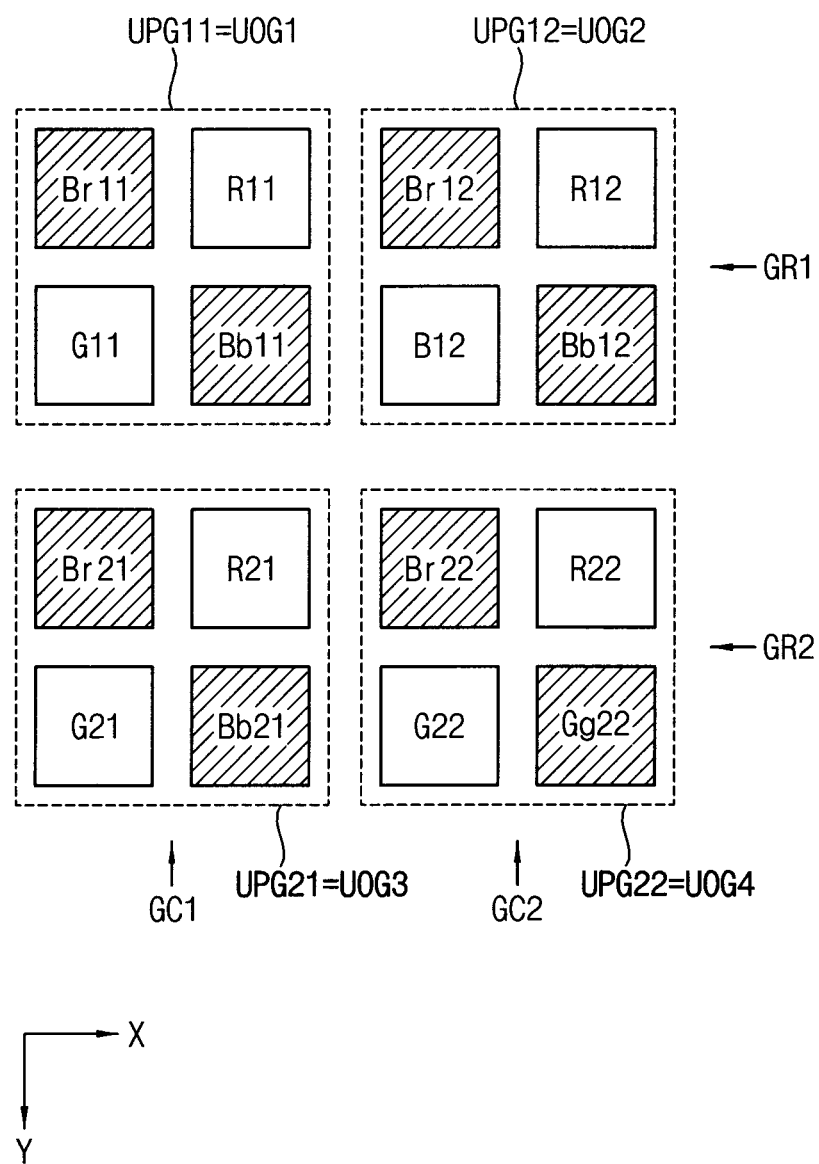
FIGS. 29, 30 and 31 are diagrams for describing an exemplary embodiment of the inventive concept for a method of controlling sensing sensitivity of an image sensor having the shared structure of FIG. 9 and the layout of FIG. 28.
Figure 30:
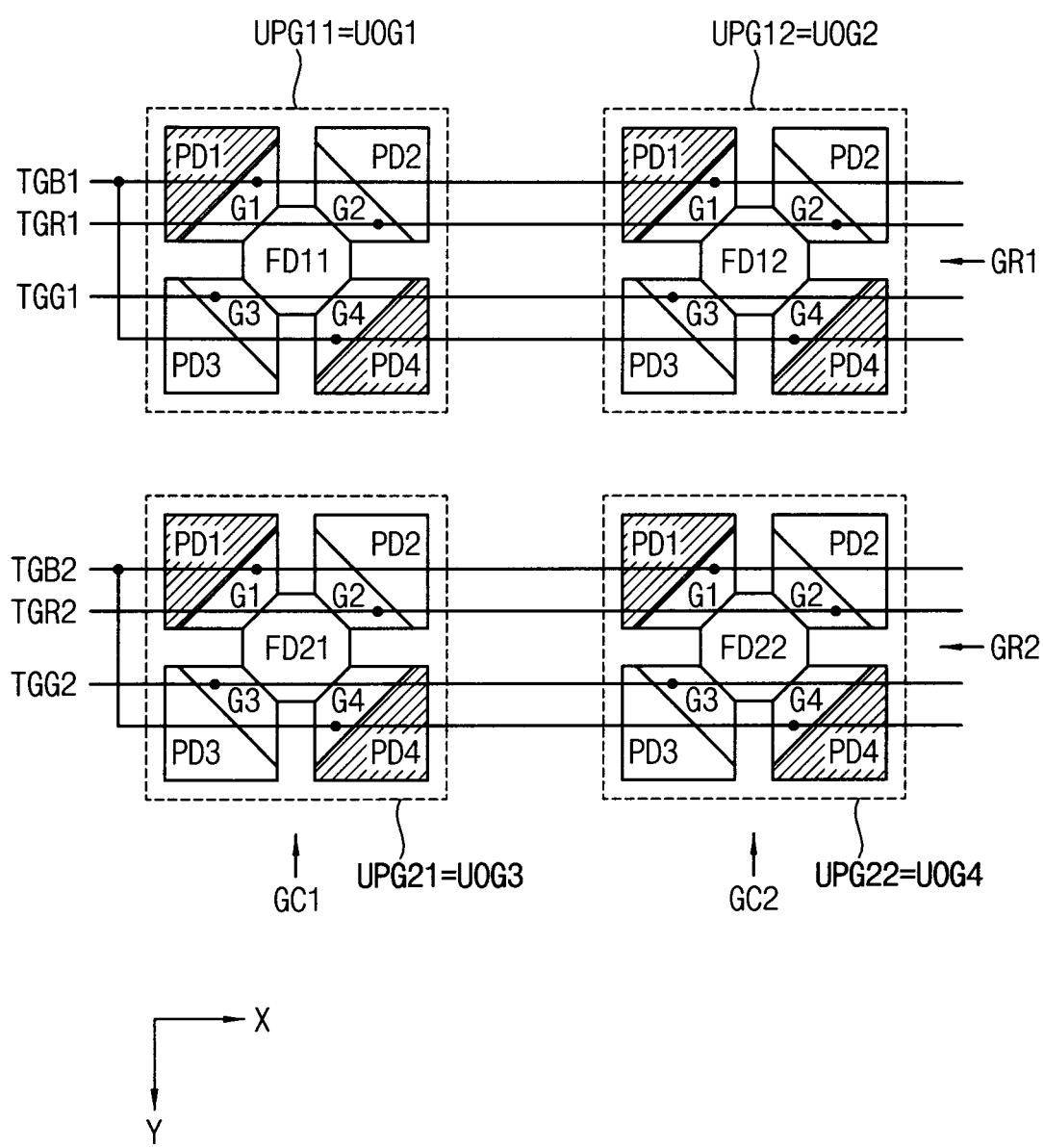
Figure 31:
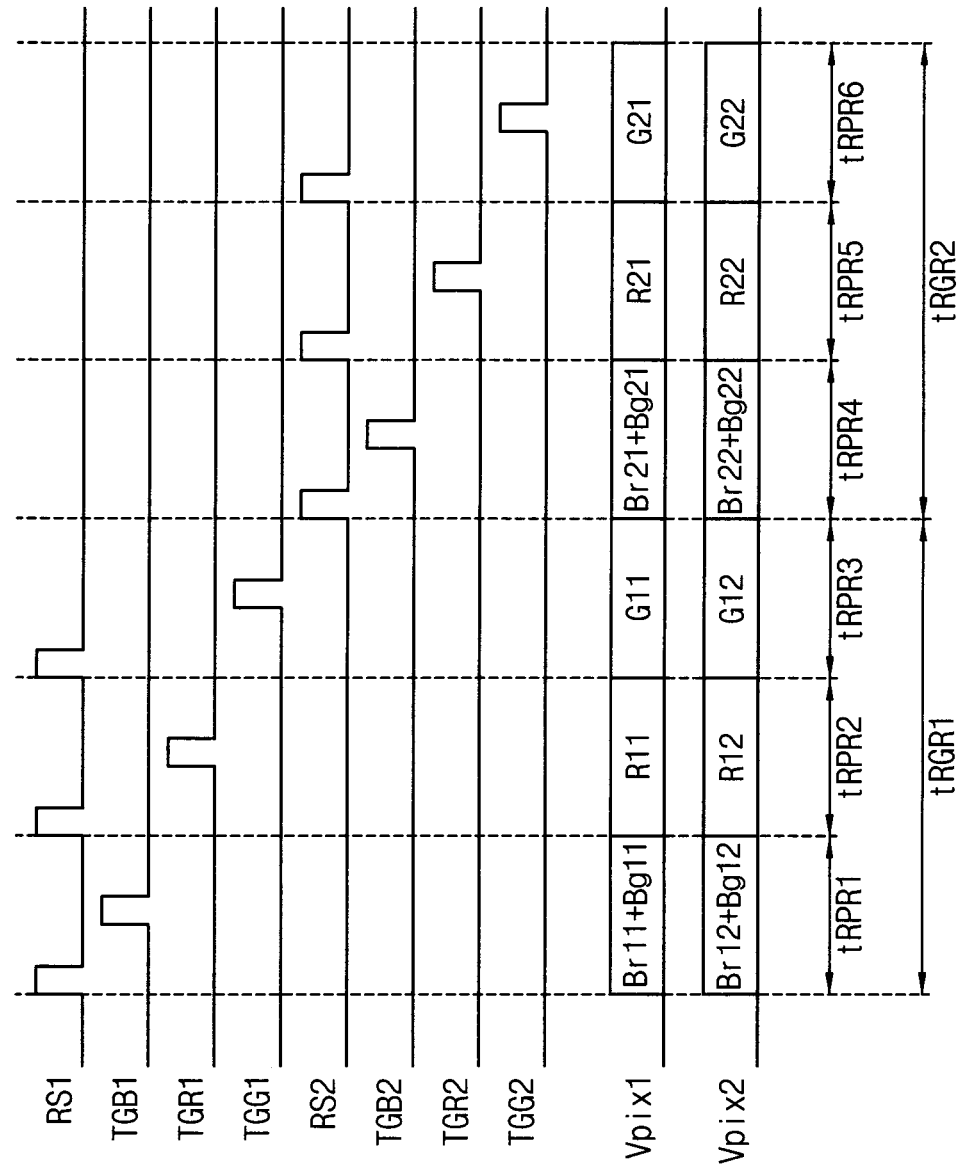

FIGS. 29, 30 and 31 are diagrams for describing an exemplary embodiment of the inventive concept for a method of controlling sensing sensitivity of an image sensor having the shared structure of FIG. 9 and the layout of FIG. 28.

FIGS. 29 and 30 illustrate a portion of the pixel array of FIG. 28, in other words, the first unit pixel group UPG11, a second unit pixel group UPG12, a third unit pixel group UPG21 and a fourth unit pixel group UPG22.

Referring to FIGS. 29 and 30, first through fourth unit pixel groups UPG11, UPG12, UPG21 and UPG22 may form first through fourth unit operation groups UOG1, UOG2, UOG3 and UOG4, respectively. As described above, "unit pixel group" indicates a minimum set of pixels that may not be further split into the smaller set in the repeated arrangement pattern of pixels, and "unit operation group" indicates a minimum set of pixels that perform the same and simultaneous sensing operation and may not be further split into the smaller set in the repeated arrangement pattern of pixels.

Referring to FIG. 30, in the first unit operation group UOG1, the blue transfer control signal TGB1, the red transfer control signal TGR1, and the green transfer control signal TGG1 may be applied to the transfer gates G1 and G4 of the blue pixels, the transfer gates G2 of the red pixels and the transfer gates G3 of the green pixels, respectively.

In the third unit operation group UOG3, the blue transfer control signal TGB2, the red transfer control signal TGR2, and the green transfer control signal TGG2 may be applied to the transfer gates G1 and G4 of the blue pixels, the transfer gates G2 of the red pixels and the transfer gates G3 of the green pixels, respectively.

Using such transfer control signals TGG1, TGR1, TGB1, TGG2, TGR2 and TGB2, each of the photo diodes PD1, PD2, PD3 and PD4 may be electrically connected to the common diffusion nodes FD11, FD12, FD21 and FD22, respectively, to transfer the photo-charged collected by each photo diode.

As illustrated in FIG. 30, the same blue transfer control signal may be applied to the two blue pixels in the same unit operation group. In other words, the blue transfer control signal TGB1 may be applied to the transfer gates G1 and G4 of the blue pixels in the first unit operation group UOG1 and the blue transfer control signal TGB2 may be applied to the transfer gates G1 and G4 of the blue pixels in the third unit operation group UOG3.

As will be described below with reference to FIG. 31, using the same blue transfer control signal, the two blue pixels in the same unit operation group may be turned on simultaneously when the sensing operation of the blue pixels is performed.

FIG. 31 is a timing diagram illustrating a first row sensing period tRGR1 corresponding to the first group row GR1 and a second row sensing period tRGR2 corresponding to the second group row GR2.

The operation of the pixels during each of first through eighth sensing periods tRPR1~tRPR8 is the same as described with reference to FIG. 8, and the repeated descriptions are omitted. The transfer control signals TGG1, TGR1, TGB1, TGG2, TGR2 and TGB2, and the reset signals RS1 and RS2 may be provided from the row driver 30 under the control of the controller 60 in FIG. 6. The first pixel signal Vpix1 may be provided through the column line of the first group column GC1, and the second pixel signal Vpix2 may be provided through the column line of the second group column GC2.

Referring to FIGS. 29, 30 and 31, in the first sensing period tRPR1, according to activation of the reset signal RS1 and the common blue transfer control signal TGB1 and the above-described charge sharing, the first pixel signal Vpix1 has a voltage level corresponding to the sum of the photo-charge collected by the first blue pixel Br11 and the second blue pixel Bg11, and the second pixel signal Vpix2 has a voltage level corresponding to the sum of the photo-charge collected by the first blue pixel Br12 and the second blue pixel Bg12.

In the second sensing period tRPR2, according to activation of the reset signal RS1 and the red transfer control signal TGR1, the first pixel signal Vpix1 has a voltage level corresponding to the photo-charge collected by the red pixel R11 and the second pixel signal Vpix2 has a voltage level corresponding to the photo-charge collected by the red pixel R12.

In the third sensing period tRPR3, according to activation of the reset signal RS1 and the green transfer control signal TGG1, the first pixel signal Vpix1 has a voltage level corresponding to the photo-charge collected by the green pixel G11 and the second pixel signal Vpix2 has a voltage level corresponding to the photo-charge collected by the green pixel G12.

In the fourth sensing period tRPR4, according to activation of the reset signal RS2 and the common blue transfer control signal TGB2 and the above-described charge sharing, the first pixel signal Vpix1 has a voltage level corresponding to the sum of the photo-charge collected by the first blue pixel Br21 and the second blue pixel Bg21, and the second pixel signal Vpix2 has a voltage level corresponding to the sum of the photo-charge collected by the first blue pixel Br22 and the second blue pixel Bg22.

In the fifth sensing period tRPR5, according to activation of the reset signal RS2 and the red transfer control signal TGR2, the first pixel signal Vpix1 has a voltage level corresponding to the photo-charge collected by the red pixel R21 and the second pixel signal Vpix2 has a voltage level corresponding to the photo-charge collected by the red pixel R22.

In the sixth sensing period tRPR6, according to activation of the reset signal RS2 and the green transfer control signal TGG2, the first pixel signal Vpix1 has a voltage level corresponding to the photo-charge collected by the green pixel G21 and the second pixel signal Vpix2 has a voltage level corresponding to the photo-charge collected by the green pixel G22.

As described with reference to FIGS. 29, 30 and 31, the sensing operation of the blue pixels may be performed by simultaneously turning on the transfer gates of the two blue pixels in the same unit pixel group, to decrease the noises of the blue pixels and increase sensing sensitivity of the blue pixels.

Figure 32:
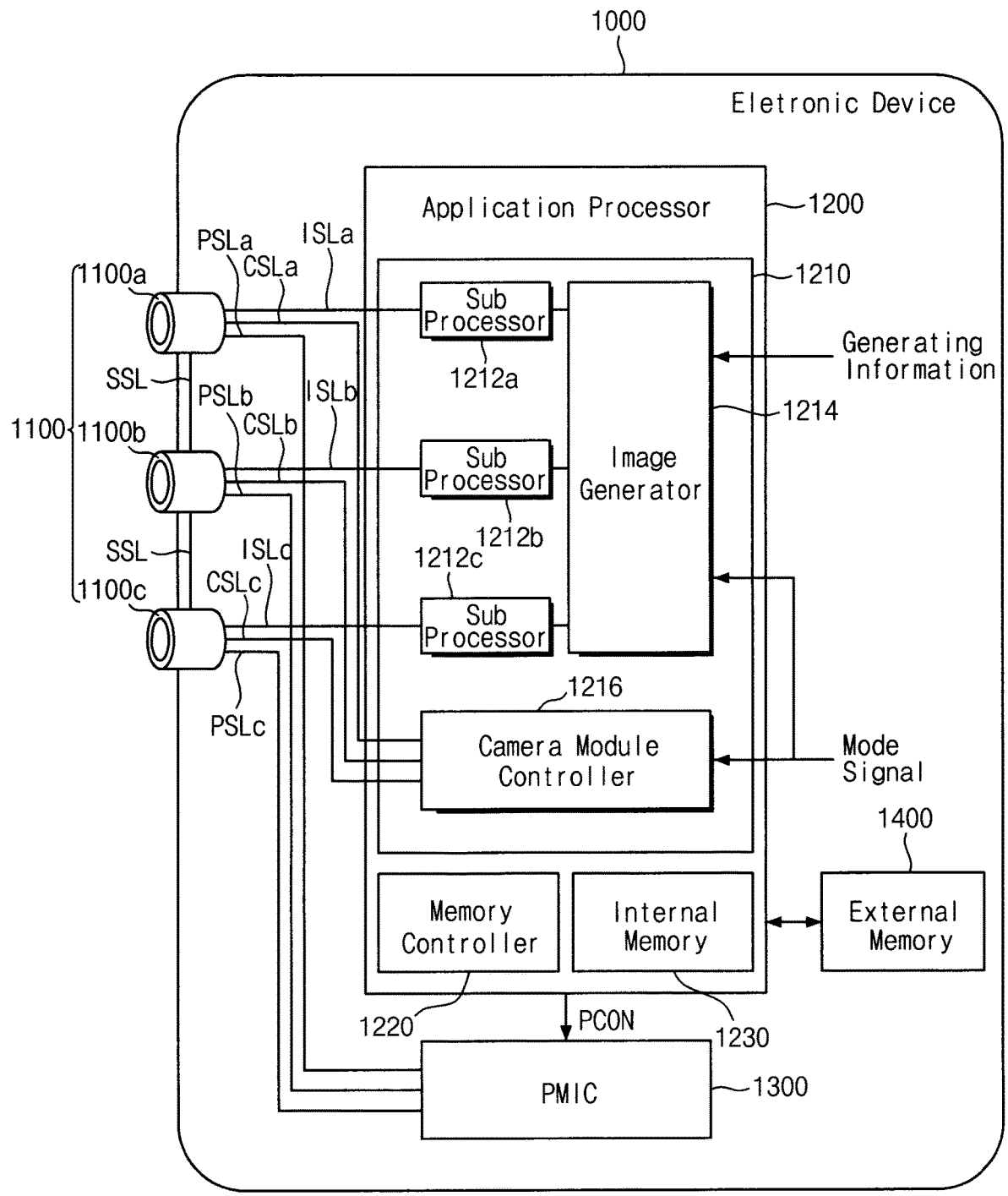
FIG. 32 is a block diagram illustrating an electronic device according to exemplary embodiments of the inventive concept.
Figure 33:
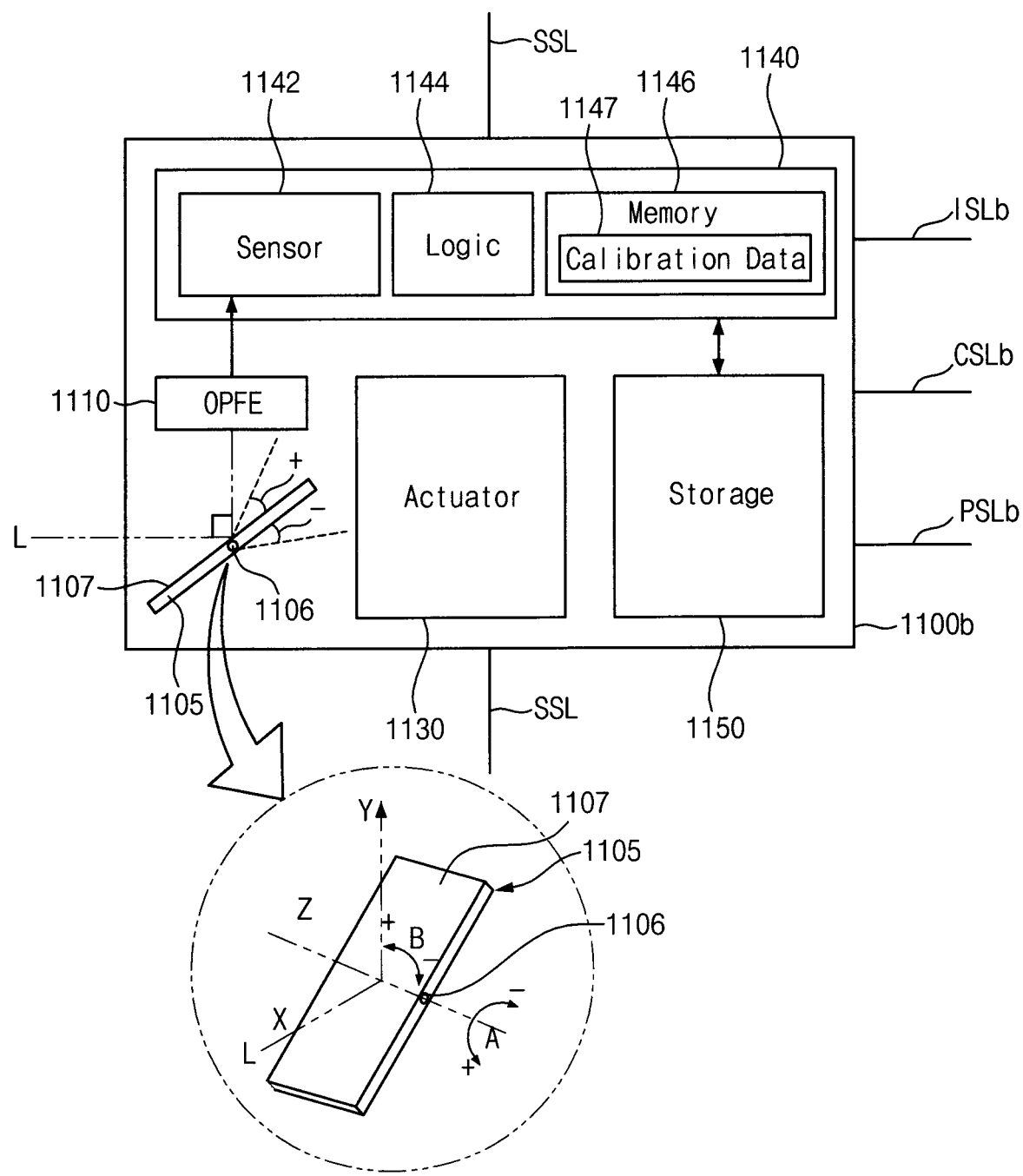
FIG. 33 is a block diagram illustrating a camera module included in the electronic device of FIG. 32.

FIG. 32 is a block diagram illustrating an electronic device according to exemplary embodiments of the inventive concept, and FIG. 33 is a block diagram illustrating a camera module included in the electronic device of FIG. 32.

Referring to FIG. 32, an electronic device 1000 may include a camera module group 1100, and application processor 1200, a power management integrated circuit (PMIC) 1300 and an external memory 1400.

The camera module group 1100 may include a plurality of camera modules 1100a, 1100b and 1100c. FIG. 32 illustrates the three camera modules 1100a, 1100b and 1100c as an example, but the inventive concept is not limited to a particular number of camera modules. According to exemplary embodiments of the inventive concept, the camera module group 1100 may include two camera modules, and four or more camera modules.

Hereinafter, an example configuration of the camera module 1100b is described with reference to FIG. 33. According to exemplary embodiments of the inventive concept, the same descriptions may be applied to the other camera modules 1100a and 1100c.

Referring to FIG. 33, the camera module 1100b may include a prism 1105, an optical path folding element (OPFE) 1110, an actuator 1130, an image sensing device 1140 and a storage device 1150.

The prism 1105 may include a reflection surface 1107 to change a path of a light L incident on the prism 1105.

In some exemplary embodiments of the inventive concept, the prism 1105 may change the path of the light L incident in a first direction X to the path in a second direction Y perpendicular to the first direction X. In addition, the prism 1105 may rotate the reflection surface 1107 around a center axis 1106 and/or rotate the center axis 1106 in the B direction to align the path of the reflected light along the second direction Y. In addition, the OPFE 1110 may move in a third direction perpendicular to the first direction X and the second direction Y.

In some exemplary embodiments of the inventive concept, a rotation angle of the prism 1105 may be smaller than 15 degrees in the positive (+) A direction and greater than 15 degrees in the negative (−) A direction, but the inventive concept is not limited thereto.

In some exemplary embodiments of the inventive concept, the prism 1105 may rotate within 20 degrees in the positive B direction and the negative B direction.

In some exemplary embodiments of the inventive concept, the prism 1105 may move the reflection surface 1107 in the third direction Z that is in parallel with the center axis 1106.

The OPFE 1110 may include optical lenses that are divided into m groups where m is a positive integer. The m lens group may move in the second direction Y to change an optical zoom ratio of the camera module 1100b. For example, the optical zoom ratio may be changed in a range of 3K, 5K, and so on by moving the m lens group, when K is a basic optical zoom ratio of the camera module 1100b.

The actuator 1130 may move the OPFE 1110 or the optical lens to a specific position. For example, the actuator 1130 may adjust the position of the optical lens for accurate sensing such that an image sensor 1142 may be located at a position corresponding to a focal length of the optical lens.

The image sensing device 1140 may include the image sensor 1142, a control logic 1144 and a memory 1146. The image sensor 1142 may capture or sense an image using the light provided through the optical lens. The control logic 1144 may control overall operations of the camera module 1100b. For example, the control logic 1144 may provide control signals through control signal line CSLb to control the operation of the camera module 1100b.

The memory 1146 may store information such as calibration data 1147 for the operation of the camera module 1100b. For example, the calibration data 1147 may include information for generation of image data based on the provided light, such as information on the above-described rotation angle, a focal length, information on an optical axis, and so on. When the camera module 1100b is implemented as a multi-state camera having a variable focal length depending on the position of the optical lens, the calibration data 1147 may include multiple focal length values and auto-focusing values corresponding to the multiple states.

The storage device 1150 may store the image data sensed using the image sensor 1142. The storage device 1150 may be disposed outside of the image sensing device 1140, and the storage device 1150 may be stacked with a sensor chip comprising the image sensing device 1140. The storage device 1150 may be implemented with an electrically erasable programmable read-only memory (EEPROM), but the inventive concept is not limited thereto.

Referring to FIGS. 32 and 33, each of the camera modules 1100a, 1100b and 1100c may include the actuator 1130. In this case, the camera modules 1100a, 1100b and 1100c may include the same or different calibration data 1147 depending on the operations of the actuators 1130.

In some exemplary embodiments of the inventive concept, one camera module 1100b may have a folded lens structure including the above-described prism 1105 and the OPFE 1110, and the other camera modules 1100a and 1100b may have a vertical structure without the prism 1105 and the OPFE 1110.

In some exemplary embodiments of the inventive concept, one camera module 1100c may be a depth camera configured to measure distance information of an object using an infrared light. In this case, the application processor 1200 may merge the distance information provided from the depth camera 1100c and image data provided from the other camera modules 1100a and 1100b to generate a three-dimensional depth image.

In some exemplary embodiments of the inventive concept, at least two camera modules among the camera modules 1100a, 1100b and 1100c may have different fields of view, for example, through different optical lenses.

In some exemplary embodiments of the inventive concept, each of the camera modules 1100a, 1100b and 1100c may be separated physically from each other. In other words, the camera modules 1100a, 1100b and 1100c may each include a dedicated image sensor 1142.

The application processor 1200 may include an image processing device 1210, a memory controller 1220 and an internal memory 1230. The application processor 1200 may be separated from the camera modules 1100a, 1100b and 1100c. For example, the application processor 1200 may be implemented as one chip and the camera modules 1100a, 1100b and 1100c may implemented as another chip or other chips.

The image processing device 1210 may include a plurality of sub processors 1212a, 1212b and 1212c, an image generator 1214 and a camera module controller 1216.

The image data generated by the camera modules 1100a, 1100b and 1100c may be provided to the sub processors 1212a, 1212b and 1212c through distinct image signal lines ISLa, ISLb and ISLc, respectively. For example, the transfer of the image data may be performed using a camera serial interface (CSI) based on the mobile industry processor interface (MIPI), but the inventive concept is not limited thereto.

In some exemplary embodiments of the inventive concept, one sub processor may be assigned commonly to two or more camera modules. In this case, a multiplexer may be used to transfer the image data selectively from one of the camera modules to the shared sub processor.

The image data from the sub processors 1212a, 1212b and 1212c may be provided to the image generator 1214. The image generator 1214 may generate an output image using the image data from the sub processors 1212a, 1212b and 1212c according to image generating information or a mode signal. For example, the image generator 1213 may merge at least a portion of the image data from the camera modules 1100a, 1100b and 1100c having the different fields of view to generate the output image according to the image generating information or the mode signal. In addition, the image generator 1214 may select, as the output image, one of the image data from the camera modules 1100a, 1100b and 1100c according to the image generating information or the mode signal.

In some exemplary embodiments of the inventive concept, the image generating information may include a zoom factor or a zoom signal. In some exemplary embodiments of the inventive concept, the mode signal may be a signal based on a selection of a user.

When the image generating information is the zoom factor and the camera modules 1100a, 1100b and 1100c have the different fields of view, the image generator 1214 may perform a different operation depending on the zoom signal. For example, when the zoom signal is a first signal, the image generator 1214 may merge the image data from the different camera modules to generate the output image. When the zoom signal is a second signal different from the first signal, the image generator 1214 may select, as the output image, one of image data from the camera modules 1100a, 1100b and 1100c.

In some exemplary embodiments of the inventive concept, the image generator 1214 may receive the image data of different exposure times from the camera modules 1100a, 1100b and 1100c. In this case, the image generator 1214 may perform high dynamic range (HDR) processing with respect to the image data from the camera modules 1100a, 1100b and 1100c to generate the output image having the increased dynamic range.

The camera module controller 1216 may provide control signals to the camera modules 1100a, 1100b and 1100c. The control signals generated by the camera module controller 1216 may be provided to the camera modules 1100a, 1100b and 1100c through the distinct control signal lines CSLa, CSLb and CSLc, respectively.

In some exemplary embodiments of the inventive concept, one of the camera modules 1100a, 1100b and 1100c may be designated as a master camera according to the image generating information of the mode signal, and the other camera modules may be designated as slave cameras.

The camera module acting as the master camera may be changed according to the zoom factor or an operation mode signal. For example, when the camera module 1100a has the wider field of view than the camera module 1100b and the zoom factor indicates a lower zoom magnification, the camera module 1100b may be designated as the master camera. In contrast, when the zoom factor indicates a higher zoom magnification, the camera module 1100a may be designated as the master camera.

In some exemplary embodiments of the inventive concept, the control signals provided from the camera module controller 1216 may include a synch enable signal. For example, when the camera module 1100b is the master camera and the camera modules 1100a and 1100c are the slave cameras, the camera module controller 1216 may provide the synch enable signal to the camera module 1100b. The camera module 1100b may generate a synch signal based on the provided synch enable signal and provide the synch signal to the camera modules 1100a and 1100c through a synch signal line SSL. As such, the camera modules 1100a, 1100b and 1100c may transfer the synchronized image data to the application processor 1200 based on the synch signal.

In some exemplary embodiments of the inventive concept, the control signals provided from the camera module controller 1216 may include information on the operation mode. The camera modules 1100a, 1100b and 1100c may operate in a first operation mode or a second operation mode based on the information from the camera module controller 1216.

In the first operation mode, the camera modules 1100a, 1100b and 1100c may generate image signals with a first speed (e.g., a first frame rate) and encode the image signals with a second speed higher than the first speed (e.g., a second frame rate higher than the first frame rate) to transfer the encoded image signals to the application processor 1200. The second speed may be lower than thirty times the first speed. The application processor 1200 may store the encoded image signals in the internal memory 1230 or the external memory 1400. The application processor 1200 may read out and decode the encoded image signals to provide display data to a display device. For example, the sub processors 1212a, 1212b and 1212c may perform the decoding operation and the image generator 1214 may process the decoded image signals.

In the second operation mode, the camera modules 1100a, 1100b and 1100c may generate image signals with a third speed lower than the first speed (e.g., the third frame rate lower than the first frame rate) to transfer the generated image signals to the application processor 1200. In other words, the image signals that are not encoded may be provided to the application processor 1200. The application processor 1200 may process the received image signals or store the receive image signals in the internal memory 1230 or the external memory 1400.

The PMIC 1300 may provide a power supply voltage to the camera modules 1100a, 1100b and 1100c, respectively. For example, the PMIC 1300 may provide, under control of the application processor 1200, a first power to the camera module 1100a through a power line PSLa, a second power to the camera module 1100b through a power line PSLb, and a third power to the camera module 1100c through a power line PSLc.

The PMIC 1300 may generate the power respectively corresponding to the camera modules 1100a, 1100b and 1100c and control power levels, in response to a power control signal PCON from the application processor 1200. The power control signal PCON may include information on the power depending on the operation modes of the camera modules 1100a, 1100b and 1100c. For example, the operation modes may include a low power mode in which the camera modules 1100a, 1100b and 1100c operate in low powers. The power levels of the camera modules 1100a, 1100b and 1100c may be the same as or different from each other. In addition, the power levels may be changed dynamically or adaptively.

As such, the image sensor and the method of controlling the sensing sensitivity of the image sensor according to exemplary embodiments of the inventive concept may enhance image quality and performance of the image sensor by efficiently increasing the sensing sensitivity of the target color pixels corresponding to the wavelength having the lowest transmission ratio.

Particularly, the image sensor and the method of controlling the sensing sensitivity of the image sensor according to exemplary embodiments of the inventive concept may enhance performance of the under display camera (UDC) by efficiently increasing the sensing sensitivity of the blue pixels corresponding to the wavelength having the lowest transmission ratio with respect to the display panel.

Exemplary embodiments of the inventive concept may be applied to any electronic devices and systems including an image sensor. For example, exemplary embodiments of the inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

While the inventive concept has been particularly shown and described with reference to exemplary embodiments thereof, it will be understood by one of ordinary skill in the art that variations in form and detail may be made thereto without departing from the spirit and scope of the inventive concept as set forth in the claims.

What is claimed is:

1. An image sensor, comprising:
    a pixel array disposed under a display panel, the pixel array including a plurality of pixels configured to perform a sensing operation by collecting a photo-charge generated by a light that penetrates the display panel;
    a row driver configured to drive the plurality of pixels row by row; and
    a controller configured to control the pixel array and the row driver such that a sensing sensitivity of blue pixels among the plurality of pixels is higher than a sensing sensitivity of red pixels and a sensing sensitivity of green pixels among the plurality of pixels,
    wherein the pixel array further includes:
    node connection switches configured to electrically connect common floating diffusion nodes of two or more blue pixels that are adjacent to each other when the sensing operation of the blue pixels is performed, wherein the node connection switches are turned on in response to a sharing control signal that is different from transfer control signals applied to transfer gates of the blue pixels, wherein the plurality of pixels are grouped into a plurality of unit pixel groups such that each unit pixel group includes one red pixel, two green pixels and one blue pixel that are electrically connected to one common floating diffusion node through respective transfer gates, wherein the plurality of unit pixel groups are grouped into a plurality of unit operation groups such that each unit operation group includes two unit pixel groups that are adjacent to each other in a row direction, and wherein the pixel array further includes:

a row node connection switch connected between two common floating diffusion nodes included in each unit operation group.

2. The image sensor of claim 1, wherein a number of the blue pixels included in the pixel array is greater than a number of the red pixels included in the pixel array and a number of the green pixels included in the pixel array.

3. The image sensor of claim 1, wherein the sensing operation of each blue pixel is performed two or more times when the sensing operation of each red pixel and each green pixel is performed once.

4. The image sensor of claim 1, wherein the row node connection switch is turned on such that the photo-charge collected by two blue pixels included in each unit operation group is summed when the sensing operation of the blue pixels is performed.

5. The image sensor of claim 1, wherein the sensing operation of the one blue pixel included in each unit pixel group is performed two or more times when the sensing operation of the one red pixel and the two green pixels included in each unit pixel group is performed once.

6. An image sensor, comprising:

a pixel array disposed under a display panel, the pixel array including a plurality of pixels configured to perform a sensing operation by collecting a photo-charge generated by a that penetrates the display panel, a row driver configured to drive the plurality of pixels row by row, and a controller configured to control the pixel array and the row driver such that a sensing sensitivity of blue pixels among the plurality of pixels is higher than a sensing sensitivity of red pixels and a sensing sensitivity of green pixels among the plurality of pixels, wherein the pixel array further includes:

node connection switches configured to electrically connect common floating diffusion nodes of two or more blue pixels that are adjacent to each other when the sensing operation of the blue pixels is performed, wherein the node connection switches are turned on in response to a sharing control signal that is different from transfer control signals applied to transfer gates of the blue pixels, wherein the plurality of pixels are grouped into a plurality of unit pixel groups such that each unit pixel group includes one red pixel, two green pixels and one blue pixel that are electrically connected to one common floating diffusion node through respective transfer gates, wherein the plurality of unit pixel groups are grouped into a plurality of unit operation groups such that each unit operation group includes four unit pixel groups that are adjacent to each other in a row direction and a column direction, and wherein the pixel array further includes:

at least one row node connection switch and at least one column node connection switch connected between four common floating diffusion nodes included in each unit operation group.

7. The image sensor of claim 6, wherein the row node connection switch and the column node connection switch are turned on such that the photo-charge collected by four blue pixels included in each unit operation group is summed when the sensing operation of the blue pixels is performed.

8. A mobile device, comprising:

a housing case having an upper surface, the upper surface having an opening;

a display panel disposed in the opening of the housing case; and an image sensor disposed below the display panel, the image sensor comprising:

a pixel array disposed under the display panel, the pixel array including a plurality of pixels configured to perform a sensing operation by collecting a photo-charge generated by a light that penetrates the display panel;

a row driver configured to drive the plurality of pixels row by row; and a controller configured to control the pixel array and the row driver such that a sensing sensitivity of blue pixels among the plurality of pixels is higher than a sensing sensitivity of red pixels and a sensing sensitivity of green pixels among the plurality of pixels, wherein the pixel array further includes:

a node connection switch configured to electrically connect a common floating diffusion node of two or more blue pixels that are adjacent to each other when the sensing operation of the blue pixels is performed, wherein the node connection switch is turned on in response to a sharing control signal that is different from transfer control signals applied to transfer gates of the blue pixels, wherein the plurality of pixels are grouped into a plurality of unit pixel groups such that each unit pixel group includes one red pixel, two green pixels and one blue pixel that are electrically connected to one common floating diffusion node through respective transfer gates, wherein the plurality of unit pixel groups are grouped into a plurality of unit operation groups such that each unit operation group includes two unit pixel groups that are adjacent to each other in a column direction, and wherein the pixel array further includes:

a column node connection switch connected between two common floating diffusion nodes included in each unit operation group.

9. The image sensor of claim 8, wherein the column node connection switch is turned on such that the photo-charge collected by two blue pixels included in each unit operation group is summed when the sensing operation of the blue pixels is performed.

* * * * *